United States Patent [19]
Hata

[11] Patent Number: 5,966,552
[45] Date of Patent: Oct. 12, 1999

[54] FLASH CIRCUIT

[75] Inventor: Yukitsugu Hata, Kanagawa, Japan

[73] Assignee: Fuji Photo Film Co., Ltd., Kanagawa, Japan

[21] Appl. No.: 08/933,984

[22] Filed: Sep. 19, 1997

[30] Foreign Application Priority Data

Sep. 20, 1996 [JP] Japan .................................. 8-249799
Sep. 30, 1996 [JP] Japan .................................. 8-259435
Sep. 30, 1996 [JP] Japan .................................. 8-259436

[51] Int. Cl.$^6$ ............................ G03B 15/05; H05B 41/26
[52] U.S. Cl. ............................................................ 396/206
[58] Field of Search .................................... 396/203, 205, 396/206, 6; 315/241 P

[56] References Cited

U.S. PATENT DOCUMENTS 4,071,884  1/1978  Maigret ........................ 315/241 P X

FOREIGN PATENT DOCUMENTS 60-44399   3/1985  Japan .
7-122389   5/1995  Japan .
8-115796   5/1996  Japan .

Primary Examiner—W. B. Perkey
Attorney, Agent, or Firm—Young & Thompson

[57] ABSTRACT

A flash circuit of a flash device for a camera or a lens-fitted photo film unit is provided with a Zener diode connected to a tap point located at an intermediate position of a secondary coil of an oscillation transformer, to tap out voltage that is proportional to but less than charge voltage in a main capacitor. When the main capacitor is charged up to a set voltage, the Zener diode conducts a Zener current, which deactivates an oscillation transistor through a stopping transistor.

21 Claims, 13 Drawing Sheets

FLASH CIRCUIT

BACKGROUND OF THE INVENTION

1. Field of the Invention

The present invention relates to a flash circuit, and more particularly to a flash circuit which automatically stops charging a main capacitor at a set charge voltage.

2. Background Arts

When the subject brightness is so low that a proper exposure would not be provided without any artificial illumination, a flash device is often used to project light toward the subject synchronously with the shutter release. Since compact cameras and lens-fitted photo film units have an inexpensive lens system of a relative large f-number, most of them are provided with a built-in flash device. For flash photography, it is necessary to charge the main capacitor up to the set voltage prior to the shutter release. The conventional flash devices start charging in response to an actuation of a flash charge switch.

A flash circuit has recently been known, for example from JPA 7-122389, wherein once a flash charge switch is turned on the main capacitor continues to be charged even after the flash charge switch is turned off. The flash circuit stops charging while the main capacitor is at the set charge voltage. Hereinafter, this type of flash device will be referred to as an autostop flash circuit.

An example of autostop flash circuit is shown in FIG. 13, which has fundamentally the same configuration as that disclosed in JPA 7-122389, except some minor differeces. In the flash circuit of FIG. 13, when a flash charge switch 80 is turned on, an oscillation transistor 81 is activated and starts oscillating due to positive feedback of an oscillation transformer 82. The oscillation causes an increase in a primary current that flows through a primary coil 82a, i.e. a collector current that flows to the collector of the oscillation transistor 81. As a result, an electromotive force induces a current through a secondary coil 82b, and the current charges a main capacitor 84 through a rectifying diode 83.

Since the collector current flows through the oscillation transistor 81, a latching transistor 85 is turned on. Thereafter when the increment of the primary current goes down, a back electromotive force is generated in the secondary coil 82b, the current fed back from the oscillation transformer 82 to the oscillation transistor 81, i.e. base current of the oscillation transistor 81, begins to decrease. However, a voltage from a battery 86 is applied to the base of the oscillation transistor 81 through the latching transistor 85 as being in the ON state, the oscillation transistor 81 is not completely turned off. Therefore, the primary current starts flowing again, thereby the oscillation transistor 81 continues to oscillate and charge the main capacitor 84.

A Zener diode 87 with a Zener voltage of 300V is provided for starting conducting a Zener current when the main capacitor 84 is charged up to a set voltage of 300V. Accordingly, when the main capacitor 84 is charged up to the set voltage a stopping transistor 88 is turned on by a base current that is applied to the base of the stopping transistor 88 due to the Zener current. When the stopping transistor 88 is turned on, the emitter and the base of the oscillation transistor 81 are connected to each other, so that the oscillation transistor 81 is completely turned off, and thus the latching transistor 85 is turned off. In this way, the oscillation stops to stop charging the main capacitor 84.

In the above autostop flash circuit, since the charge voltage of the main capacitor is applied to the Zener diode to conduct the Zener current for activating the stopping transistor when the charge voltage reaches the set value, the Zener diode must have a high Zener voltage, e.g. 300V, in correspondence with the set charge voltage. As the Zener diode with high Zener voltage is expensive, it raises the cost of the flash circuit. In addition, the conventional autostop flash circuit requires a lot of space for mounting various elements as above which are necessary for the automatic continuation and stopping of charging.

SUMMARY OF THE INVENTION

In view of the foregoing, a prime object of the present invention is to provide an autostop flash circuit with reduced cost and space without lowering reliability and stability.

To achieve the above objects, according to the present invention, a flash circuit is provided with an oscillation transformer having a primary coil connected to a power source and a secondary coil connected to a main capacitor, for boosting a low power source voltage up to a high voltage for charging the main capacitor; an oscillation transistor connected between the power source and the primary coil and oscillating in cooperation with the oscillation transformer to conduct oscillating current through the primary coil; and an oscillation stopping device which taps out voltage proportional to but less than charge voltage in the main capacitor from the oscillation transformer, and which is driven to deactivate the oscillation transistor when the charge voltage in the main capacitor reaches a set voltage.

According to a preferred embodiment, the oscillation stopping device is comprised of a stopping transistor whose base is connected to one terminal of a tertiary coil of the oscillation transformer through a voltage divider, whose emitter is connected to base of the oscillation transistor, and whose collector is connected to a negative terminal of the power source. When the charge voltage reaches the set voltage, the stopping transistor is turned on to connect the base of the oscillation transistor to the emitter thereof, thereby deactivating the oscillation transistor.

According to another preferred embodiment, the oscillation stopping device is comprised of a stopping transistor and a Zener diode connected between a tap point located at an intermediate position of the secondary coil of and base of the stopping transistor. The stopping transistor is turned on in response to a Zener current conducted through the Zener diode when the main capacitor is charged up to the set voltage. The stopping transistor being connected to the oscillation transistor such that the oscillation transistor is deactivated when the stopping transistor is turned on.

It is preferable to provide a capacitor that is charged with the Zener current, and connect the stopping transistor to the stopping capacitor through a resistor, such that the stopping transistor is turned on for a time while a current discharged from the stopping capacitor is applied through the resistor.

It is also preferable to provide an oscillation stopping device which detects oscillation frequency from the oscillation transformer, as being proportional to charge voltage in the main capacitor, and deactivates the oscillation transistor when it is determined based on the oscillation frequency that the charge voltage in the main capacitor reaches a set voltage.

In any case, it is unnecessary to provide an expensive Zener diode with a high Zener voltage.

By integrating the oscillation stopping device into an IC chip, the flash circuit can be produced in a compact size.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
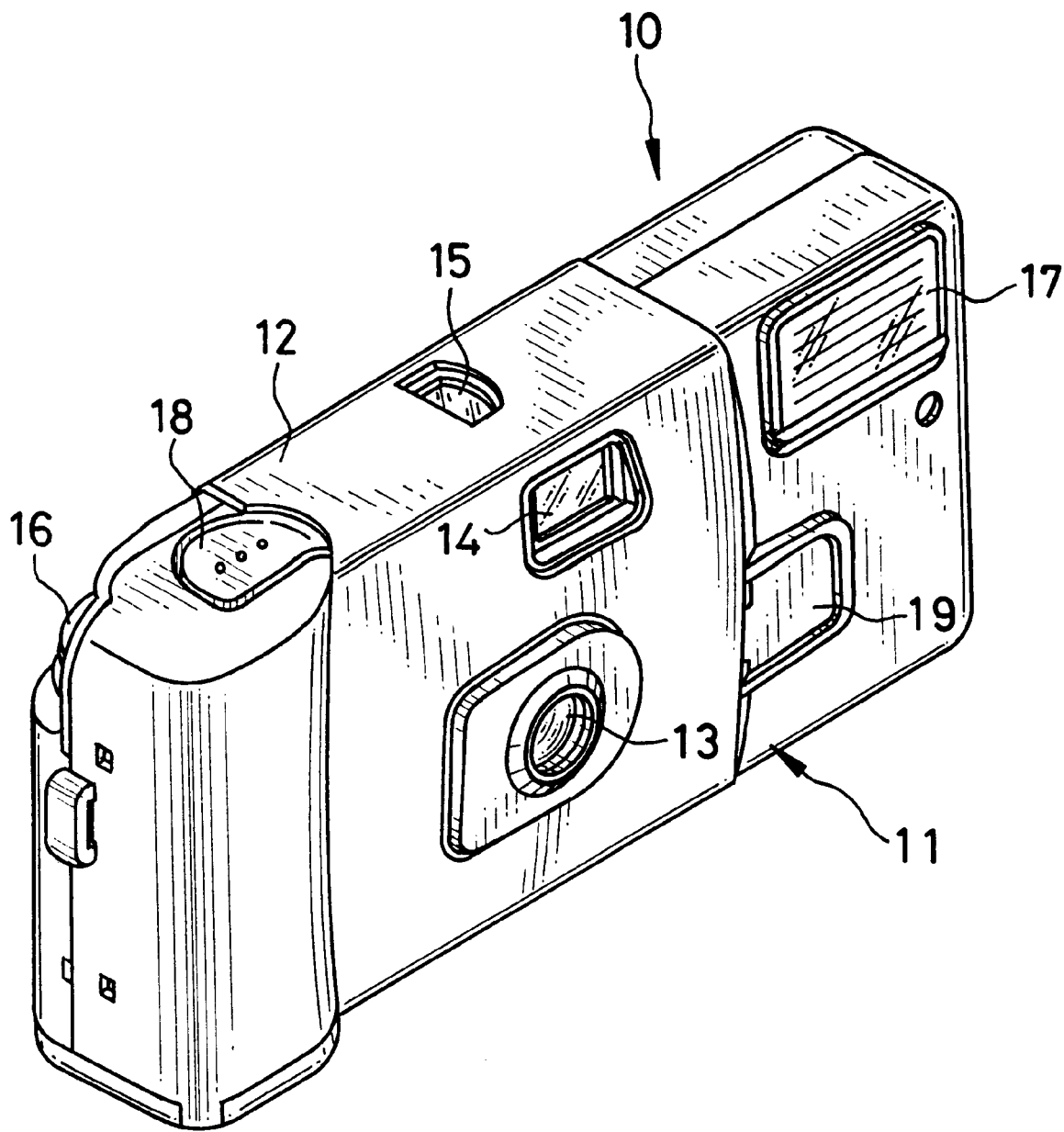
FIG. 1 is a perspective view of a lens-fitted photo film unit.

Referring to FIG. 1, a lens-fitted photo film unit 10 has a unit body 11 containing a photo filmstrip. A simple photographic mechanism and a flash device are incorporated into the unit body 11. A decorative cardboard paper 12 is wrapped around the unit body 11. A taking lens 13, a viewfinder 14, a frame counter window 15, a film winding wheel 16, a flash projector 17, a shutter button 18, a flash charge button 19 and other necessary elements are exposed to the outside through openings of the cardboard paper 12 or located out of the cardboard paper 12. An indication window for indicating that the flash device is ready to flash is formed besides an eyepiece of the viewfinder 14, through they are not shown in the drawings.

Figure 2:
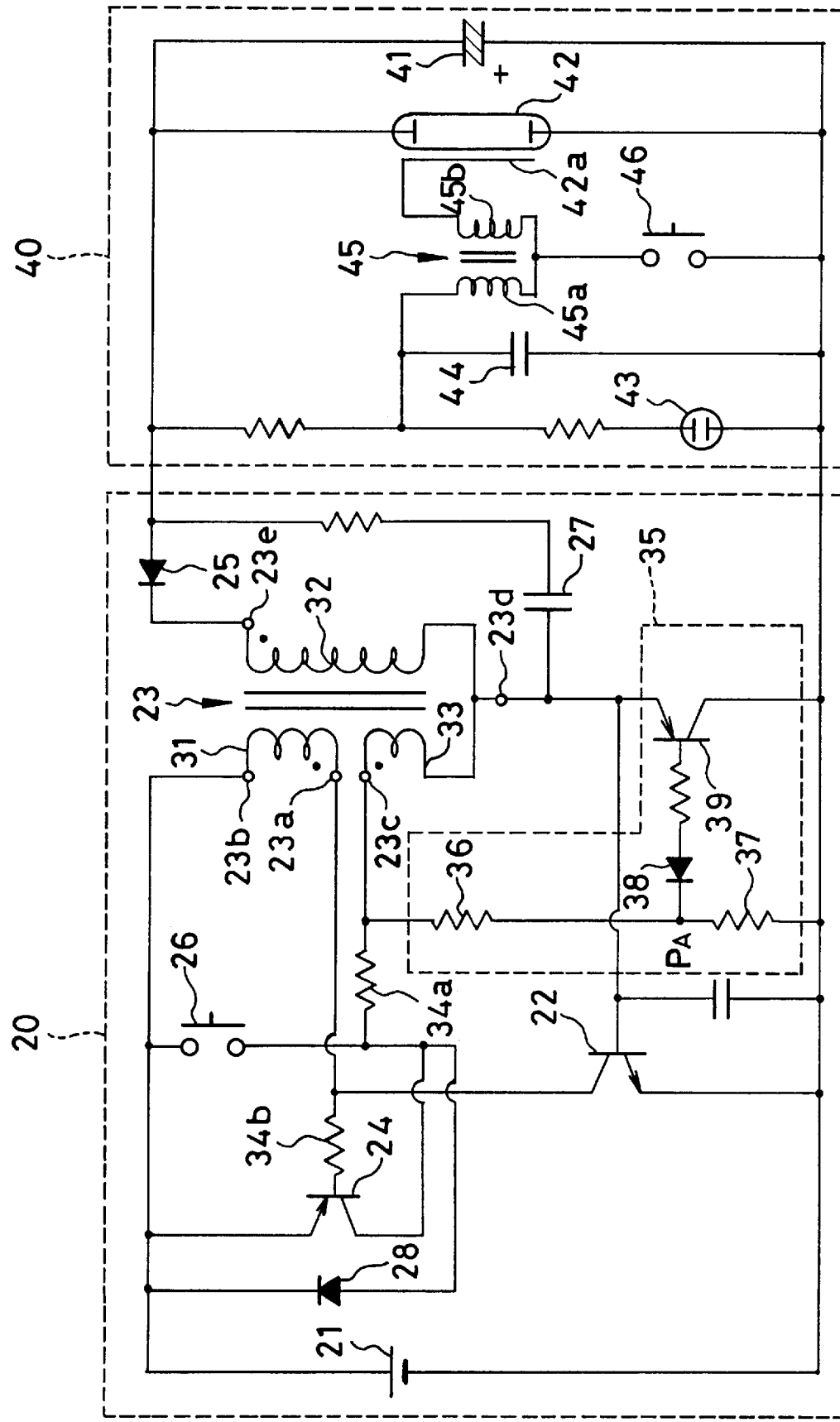
FIG. 2 is a circuit diagram of a flash circuit according to a first embodiment of the invention.

Referring to FIG. 2 showing a flash circuit of the flash device, a flash charge switch 26 is turned on so long as the flash charge button 19 is depressed. Once the flash charge switch 26 is turned on for a moment by depressing the flash charge button 19, the flash circuit continues to charge a main capacitor 41 up to a set charge voltage even after the flash charge switch 26 is turned off as the photographer quits depressing the flash charge button 19. Once the main capacitor 41 is charged up to the set voltage, the main capacitor 41 is automatically repeatedly charged up to the set voltage immediately after each flashing.

The flash circuit roughly consists of a booster section 20 and a charging-discharging section 40. The booster section 20 is mainly constituted of a battery 21 of 1.5V as a power source, an oscillation transistor 22 of NPN type, an oscillation transformer 23, a latching transistor 24 of PNP type, a charge current rectifying diode 25, the flash charge switch 26, a recharging capacitor 27 and an oscillation stopping circuit 35.

The oscillation transformer 23 is constituted of a primary coil 31, a secondary coil 32 and a tertiary coil 33 which are inductively coupled to one another. In the oscillation transformer 31, terminals of the primary coil 31 are referred to as first and second terminals 23a and 23b, one terminal of the tertiary coil 33 is referred to as a third terminal 23c, another terminal of the tertiary coil 33, which is also one terminal of the secondary coil 32, is referred to as a fourth terminal 23d, and another terminal of the second coil 32 is referred to as a fifth terminal 23e.

The first and second terminals 23a and 23b of the oscillation transformer 23 are connected to the collector of the oscillation transistor 22, and the positive terminal of the battery 21, respectively. The third terminal 23c is connected to the positive terminal of the battery 21 through a resistor 34a and the flash charge switch 26. The fourth terminal 23d is connected to the base of the oscillation transistor 22, and the fifth terminal 23e is connected through the charge current rectifying diode 25 to the negative side of the charging-discharging section 40, that is, the negative terminal of the main capacitor 41. The cathode of the charge current rectifying diode 25 is connected to the fifth terminal 23e. The emitter of the oscillation transistor 22 is connected to the negative terminal of the battery 21 and thus grounded.

The oscillation transistor 22 and the oscillation transformer 23 constitute a well-known blocking oscillator that is directed to transforming the low voltage of the battery 21 to the high voltage for charging the main capacitor 41. The oscillation transistor 22 is activated to conduct its collector current to the primary coil 31 when the flash charge switch 26 is turned on. As the base current of the oscillation transistor 22 increases due to the positive feedback from the oscillation transformer 23, the collector current increases, and thus the oscillation transistor 22 oscillates.

While the oscillation transistor 22 oscillates, a high voltage, e.g. an alternating voltage of about 100V, is generated in accordance with the turn ratio of the primary coil 31 to the secondary coil 32. The charge current rectifying diode 25 supplies the charging-discharging section 40 only the secondary current flowing through the secondary coil 32 in a direction from the fifth terminal 23e to the fourth terminal 23d.

The latching transistor 24 applies a bias voltage to the base of the oscillation transistor 22 after the flash charging switch 26 is turned off, thereby to keep the oscillation transistor 22 oscillating. The latching transistor 24 is connected at its emitter to the positive terminal of the battery 21, and at its base to the collector of the oscillation transistor 22 through a resistor 34b. In this way, the latching transistor 24 is turned on in response to the activation of the oscillation transistor 22, so that the oscillation transistor 22 continues to oscillate even after the flash charge switch 26 is turned off, because of positive feedback from the latching transistor 24. It is possible to omit the latching transistor 24.

When a back electromotive force is generated in the tertiary coil 33 while the flash charging switch 26 is off, if there is no current loop or runaway for the back electromotive force, the oscillation of the blocking oscillator would be destabilized, or it would take longer time to charge up the main capacitor 41. To avoid this problem, a looping diode 28 is provided for forming a current loop for the back electromotive force on the tertiary coil 33. Anode of the looping diode 28 is connected through the resistor 34a to the third terminal 23c of the tertiary coil 33, and cathode thereof is connected to the positive terminal of the battery 21.

The oscillation stopping circuit 35 is mainly constituted of a voltage dividing resistors 36 and 37, a rectifying diode 38, and a stopping transistor 39 of PNP type. The voltage dividing resistors 36 and 37 are connected in serial between the third terminal 23c of the oscillation transistor 23 and the ground. The emitter of the stopping transistor 39 is connected to the fourth terminal 23d of the oscillation transformer 23, and the collector is grounded.

The base of the stopping transistor 39 is connected to a connecting point $P_A$ between the voltage dividing resistors 36 and 37 through a resistor 34c and the rectifying diode 38. Therefore, a voltage at the third terminal 23c is divided by the voltage dividing resistors 36 and 37 before being applied to the base of the stopping transistor 39. The anode of the rectifying diode 38 is connected to the base of the stopping transistor 39. The rectifying diode 38 is provided for protecting the stopping transistor 39 from a high reverse bias voltage that would otherwise be applied to the emitter-base circuit of the stopping transistor 39 and break it.

The stopping transistor 39 is activated by a potential difference or voltage "V4–Va" that is applied across the emitter-base circuit thereof, wherein V4 is a potential level of the fourth terminal 23d, and Va is a potential level of the connecting point $P_A$. Unless the charge voltage in the main capacitor 41 reaches the set value, the stopping transistor 39 is not turned on, because the potential difference V4–Va does not go above an activation voltage $V_{ON}$ that is necessary to turn on the stopping transistor 39, i.e. to make the emitter-collector circuit of the stopping transistor 39 conductive. When the charge voltage reaches the set value, the potential difference V4–Va goes above the activation voltage $V_{ON}$ while the electromotive force is generated on the oscillation transformer 23, so that the stopping transistor 39 is turned on. The activation voltage $V_{ON}$ includes a voltage drop, e.g. 0.6V, through the rectifying diode 38. That is, the stopping transistor 39 is actually turned on by a voltage that is given by reducing the voltage drop value from the activation voltage $V_{ON}$.

When the stopping transistor 39 is turned on, the base and the emitter of the oscillation transistor 22 take the same potential level, so that the oscillation transistor 22 is turned off, and thus the latching transistor 24 is turned off. Of course, the resistance values of the resistors 36 and 37 are determined according to the potential difference between the third and fourth terminals 23c and 23d, such that the stopping transistor 39 is turned on when the main capacitor 41 is charged up to the set charge voltage.

As described so far, since the stopping transistor 39 is turned on and off by means of the voltage dividing resistors 36 and 37 and the rectifying diode 38 which are comparatively inexpensive, the cost of the flash circuit is saved, and the construction is simplified.

The charging-discharging section 40 is constituted of the main capacitor 41, the flash discharge tube 42, a neon lamp 43, a triggering electrode 42a, a triggering transformer 45, a triggering capacitor 44, a triggering switch 46 and so forth. The main capacitor 41 is connected in parallel to the flash discharge tube 42. The positive terminal of the main capacitor 41 is also connected to the minus pole of the battery 21 and thus grounded. The negative terminal of the main capacitor 41 is connected to anode of the charge current rectifying diode 25. Since the set charge voltage of the main capacitor 41 is 300V in the present embodiment, the flash discharge tube 42 is designed to flash light of a predetermined amount when the voltage of 300V is applied to it.

The current from the booster section 20 is charged in the main and triggering capacitors 41 and 44. When the main capacitor 41 is charged up to its set charge voltage of 300V, the neon lamp 43 starts lighting. The light from the neon lamp 43 is conducted through a light guide or the like to the indication window near the eyepiece, so that the photographer can see that the flash device is ready to flash.

The trigger switch 46 is turned on when a shutter blade is opened up. Then, the triggering capacitor 44 discharges current to a primary coil 45a of the triggering transformer 45. As a result, a high voltage trigger voltage, e.g. 4 KV, is induced in a secondary coil 45b of the transformer 45, which is applied to the triggering electrode 42a. The high voltage ionizes Xenon gas in the flash discharge tube 42 to break the resistance between its electrodes, so that the main capacitor 41 discharges, causing the flash discharge tube 42 to flash.

The recharging capacitor 27 of the booster section 20 is charged with the secondary current of the secondary coil 32, in the same way as the main capacitor 41. The charge loaded in the recharging capacitor 27 is discharged when the flash discharge tube 42 flashes, and flows into the base of the oscillation transistor 22, so that the oscillation transistor 22 is turned on to restart charging the main capacitor 41.

The above embodiment operates as follows:

First the photographer rotates the film winding wheel 16 of the film unit 10 to wind up the filmstrip by one frame and also cock the shutter. If a flash photography is needed, the flash charge button 19 is depressed to turn on the flash charge switch 26. The photographer can quit depressing the flash charge button 19 as soon as it is fully depressed.

When the flash charge switch 26 is turned on, the base current is applied to the oscillation transistor 22 through the resistor 34a and the tertiary coil 33. Thereby, the oscillation transistor 22 is activated to conduct the collector current as much as the base current. As the collector current flows from the second terminal 23b through the primary coil 31 to the first terminal 23a, the collector current is equal to the primary current.

Because of the primary current, the electromotive force of the high voltage is generated in the secondary coil 32, so that the secondary current flows from the fifth terminal 23e to the fourth terminal 23d. The secondary current flows into the base of the oscillation transistor 22, so that the base current increases. As the base current increases, the collector current, i.e. the primary current through the primary coil 31 increases.

When the oscillation transistor 22 is turned on, the current flowing to the collector of the oscillation transistor 22 is also applied to the base of the latching transistor 24, so that the latching transistor 24 is turned on. Then, the voltage of the battery 21 begins to be applied to the base of the oscillation transistor 22 through the resistor 34a and the tertiary coil 33.

Because of the positive feedback from the oscillation transformer 23, the base current of the oscillation transistor 22 and the collector current of the oscillation transistor 22 increase concurrently. But as the oscillation transistor 22 is being saturated, the collector current is getting less increase. Thereby, the change in the primary current becomes smaller, and back electromotive forces are generated in the respective coils 31 to 33 of the oscillation transformer 23. Due to the back electromotive force, the current flowing from the secondary coil 32 to the base of the oscillation transistor 22 drops down. Thus, the collector current of the oscillation transistor 22 drops down.

However, because the latching transistor 24 applies the base voltage of the oscillation transistor 22, the oscillation transistor 22 is not completely turned off. After the back electromotive force on the oscillation transformer 23 stops, the base voltage from the latching transistor 24 causes the collector current of the oscillation transistor 22 to increase again. Accordingly, the primary current begins to increase again. In this way, even after the flash charge switch 26 is turned off, the oscillation transistor 22 or the blocking oscillator continues to oscillate.

The secondary current is generated by the electromotive force of the high voltage induced in the secondary coil 32 during the oscillation. Among the secondary current, those flowing in the direction from the fifth terminal 23e to the fourth terminal 23d are supplied through the charge current rectifying diode 25 to the charging-discharging section 40, and is charged in the main capacitor 41 and the triggering capacitor 44. Simultaneously, the recharging capacitor 27 is charged with this secondary current.

Figure 3A:
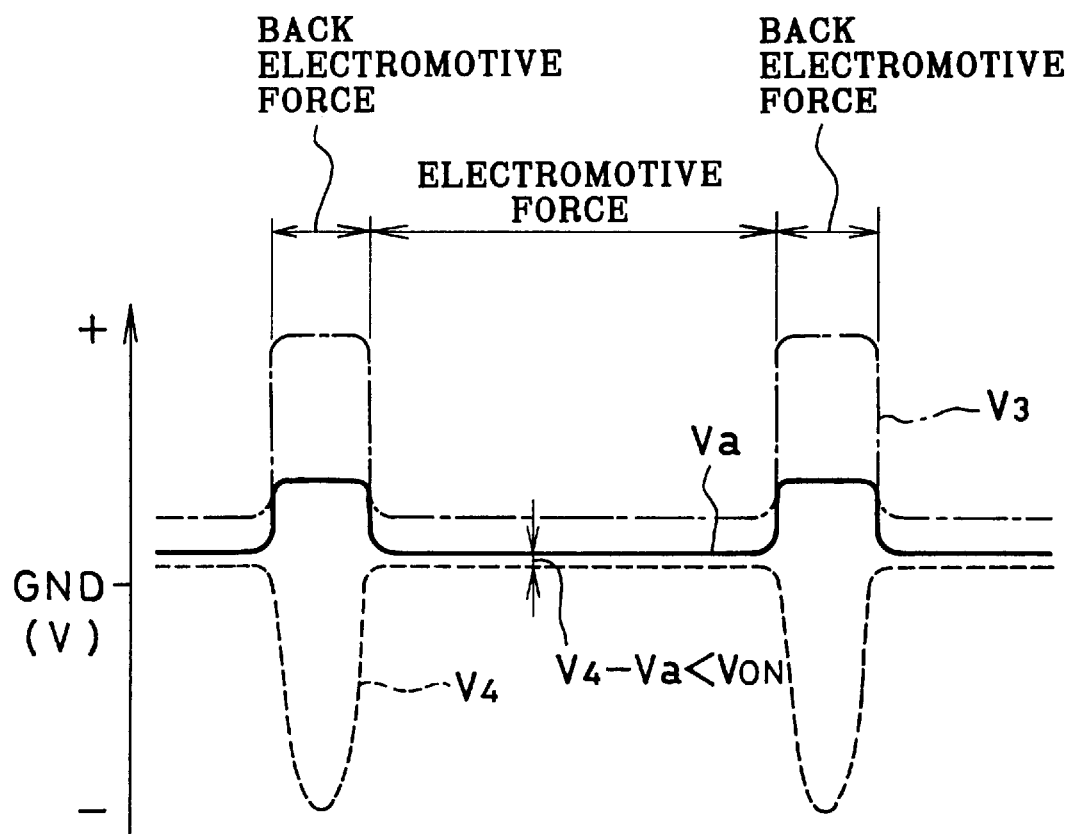
FIGS. 3A and 3B are timing charts illustrating the operation of the flash circuit of the first embodiment.
Figure 3B:
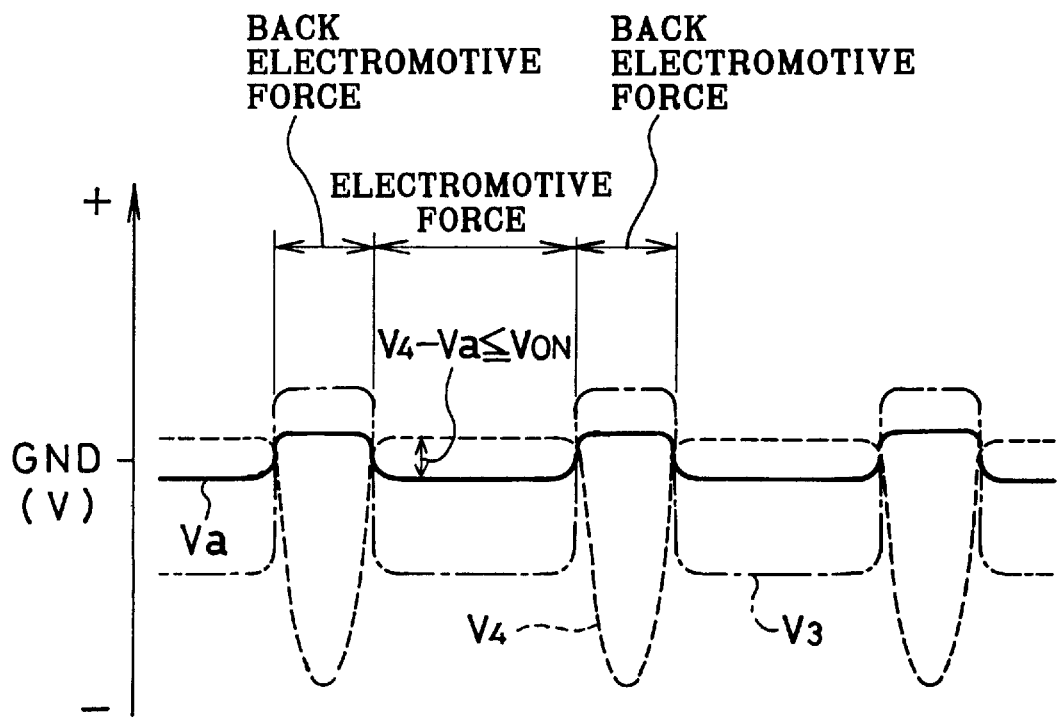

On the assumption that the ground potential GND at the minus pole of the battery 21 is a reference level (=0V), the potential level V4 at the fourth terminal 23d is maintained at a constant level that is higher than the ground potential GND by the base-emitter voltage of the oscillation transistor 22 while the electromotive force is generated on the oscillation transformer 23 in the first stage of charging when the charge voltage is around 0V, as shown in FIG. 3A. Since the potential level V3 at the third terminal 23c is higher than the potential level V4 at the fourth terminal 23d in the beginning of charging, the potential level Va at the connecting point $P_A$ is correspondingly higher than that at the fourth terminal 23d. Also while the back electromotive force is generated, the potential level Va at the connecting point $P_A$ is higher than the potential level V4. As the voltage V4−Va is applied across the emitter-base circuit of the stopping transistor 39 in the opposite direction to that for activating the stopping transistor 39, the stopping transistor 39 is not turned on. The diode 38 blocks the voltage V4−Va of the opposite direction from being directly applied to the stopping transistor 39, the stopping transistor 39 is prevented from breaking down.

As the main capacitor 41 is charged, the voltage across the main capacitor 41 increases. In this embodiment, the main capacitor 41 is designed to be charged in the negative direction. That is, the positive terminal of the main capacitor 41 is maintained 0V, and the potential level at the negative terminal of the main capacitor 41 goes down as the main capacitor 41 is charged. As a result, the load on the secondary coil 32 increases, and the potential level at the fifth terminal 23e goes down, so that the secondary current caused by the electromotive force on the secondary coil 32 decreases. Since the secondary coil 32 is inductively coupled to the tertiary coil 33, the electromotive force on the tertiary coil 33 decreases with the decreasing secondary current.

Correspondingly, the potential V3 at the third terminal 23c of the tertiary coil 33 gradually goes down, and thus the potential level Va at the connecting point $P_A$ gradually goes down. While the electromotive force is generated, the potential level Va goes below the potential level V4, so that the voltage V4−Va applied to the stopping transistor 39 turns to the direction for activating the stopping transistor 39. However, the voltage of this direction is not large enough to turn on the stopping transistor 39 until the main capacitor 41 is charged up to the set charge voltage. Accordingly, the oscillation transistor 22 continues to oscillate until the main capacitor 41 is charged up to the set charge voltage.

When the main capacitor 41 is charged up to the set voltage, i.e. 300V in this embodiment, the potential difference V4−Va becomes more than the activation voltage $V_{ON}$, so long as the electromotive force is generated. In this way, the stopping transistor 39 is turned on.

When the stopping transistor 39 is turned on, the base of the oscillation transistor 22 is connected to the emitter thereof through the stopping transistor 39, so that the oscillation transistor 22 is turned off. When the oscillation transistor 22 is turned off, the base current of the latching transistor 24 stops, so that the latching transistor 24 is turned off. Then, the oscillation transistor 22 does not continue to oscillate, thereby stopping charging the main capacitor 41. When the charging stops, the stopping transistor 39 is turned off. Even when the stopping transistor 39 is turned off, the oscillation transistor 22 cannot restart oscillating.

Beside that, the neon lamp 43 starts lighting when the main capacitor 41 is charged up to the set voltage, so that the photographer can see that the flash device is ready to flash. Then, the photographer can depress the shutter button 18 to make the flash photography while framing through the viewfinder 14.

When the shutter button 18 is depressed, the shutter is activated, and the triggering switch 46 is turned on the moment the shutter is fully opened. Upon the triggering switch 46 being turned on, the triggering capacitor 44 discharges, so that the current flows through the primary coil 45a of the triggering transformer 45, inducing the triggering voltage across the secondary coil 45b. The triggering voltage is applied through the triggering electrode 42 to the flash discharge tube 42. Then, the main capacitor 41 is discharged through the flash discharge tube 42, causing the flash discharge tube 42 to flash. The flash light is projected through the flash window 6. In this way, the flash photography is accomplished.

Simultaneously with the discharge of the main capacitor 41, the recharging capacitor 27 is discharged through the flash discharge tube 42. The discharged current from the recharging capacitor 27 flows into the base of the oscillation transistor 22. Thereby, the oscillation transistor 22 is reactivated. When the oscillation transistor 22 is reactivated, the latching transistor 24 is turned on just like when the flash charge switch 26 is turned on for a moment. The latching transistor 24 makes the oscillation transistor 22 continue oscillating. In this way, the main capacitor 41 starts to be charged again.

Figure 4:
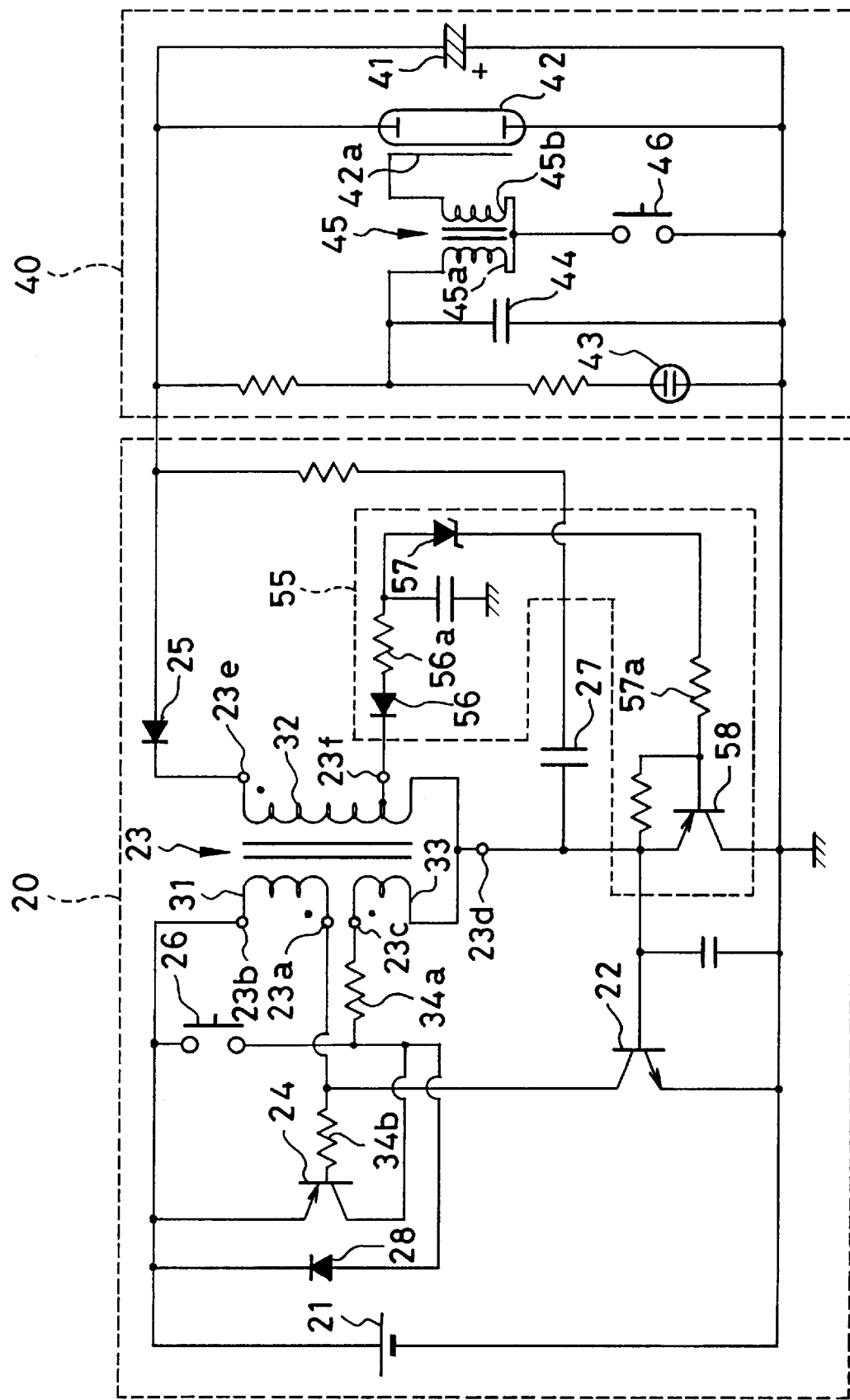
FIG. 4 is a circuit diagram of a flash circuit according to a second embodiment of the invention.

FIG. 4 shows a flash circuit according to a second embodiment of the invention, whose fundamental configurations are equivalent to those of the first embodiment, so that the following description merely relates to those portions essential to the second embodiment.

An oscillation transistor 22 and an oscillation transformer 23 constitute a well-known blocking oscillator that is directed to transforming a low voltage of a battery 21 to a high voltage for charging a main capacitor 41. The oscillation transformer 23 has a tap point 23f at an intermediate position of a secondary coil 32, in addition to first to fifth terminals 23a to 23e. The potential level Vf at the tap point 23f varies alternately in correspondence with the oscillation of the oscillation transformer 23. Beside that, the potential level Vf in total changes proportionally to the charge voltage in the main capacitor 41.

As the positive terminal of the main capacitor 41 is connected to the minus pole of the battery 21, the potential at the positive terminal of the main capacitor 41 is maintained at a ground voltage GND (=0V), while the potential at the negative terminal of the main capacitor 41 goes down by the charging. Thus, the charge voltage is an absolute value equal to a potential difference between the positive and negative terminals of the main capacitor 41. In this way, the main capacitor 41 is charged in the negative direction, so the potential Vf at the tap point 23f goes down proportionally as the charge voltage increases.

According to the second embodiment, an oscillation stopping circuit 55 is mainly constituted of a rectifying diode 56, a Zener diode 57 and a stopping transistor 58. The cathode of the rectifying diode 56 is connected to the tap point 23f, and the anode of the rectifying diode 56 is connected to the anode of the Zener diode 57 through a resistor 56a. The rectifying diode 56 is provided for rectifying the oscillating or alternating voltage at the tap point 23f, and tapping out only negative halves of the alternating voltage. The rectifying diode 56 also functions as a temperature compensating element for the Zener diode 57, as set forth in detail later. A capacitor 59 is provided for smoothing the voltage from the rectifying diode 56, and applying it as a DC voltage to the Zener diode 57. The stopping transistor 58 has the base connected to the cathode of the Zener diode 57 through a resistor 57a, the emitter connected to the fourth terminal 23d of the oscillation transformer 23, and the collector grounded.

The tap point 23f is located such that the potential difference or voltage "V4–Vf" between the fourth terminal 23d and the tap point 23f comes to a given voltage Von1 while an electromotive force is generated in the secondary coil 32 after the main capacitor 41 is charged up to a set charge voltage, e.g. 300V. More specifically, the tap point 23f is located such that the DC voltage applied across the Zener diode 57 reaches a Zener voltage $V_Z$ of the Zener diode 57 when the charge voltage across the main capacitor 41 reaches the set value.

The voltage Von1 is given by adding a voltage drop amount through the rectifying diode 56, e.g. about 0.6V, to a Zener voltage $V_Z$, e.g. 10V, of the Zener diode 57. In this instance, the given voltage Von1 is 10.6V, and the tap point 23f is located where the turn number between the tap point 23f and the fourth terminal 23d is about 1/30 the total turn number of the secondary coil 32.

However, if the Zener voltage $V_Z$ of the Zener diode 37 is 30V, the voltage Von1 is given as 30.6V, and the tap point 23f is located where the turn number between the tap point 23f and the fourth terminal 23d is about 1/10 the total turn number of the secondary coil 32.

According to the above circuit construction, the Zener diode 57 is supplied with the DC voltage which is obtained through the rectifying diode 56 and the smoothing capacitor 59 from the alternating voltage between the fourth terminal 23d and the tap point 23f, i.e. from the potential difference V4–Vf. Accordingly, the Zener voltage $V_Z$ of the Zener diode 57 may be low, e.g. 10V, so that an inexpensive Zener diode may be used as the Zener diode 57. When the main capacitor is charged up to the set voltage of 300V, the potential difference V4–Vf reaches the given value Von1, and thus the Zener voltage $V_Z$ is applied across the Zener diode 57. Then, the Zener diode 57 conducts a Zener current of the opposite direction to the charging current.

Unless the Zener diode 57 conducts the Zener current, no current flows in the base of the stopping transistor 58, so that the stopping transistor 58 is in the OFF state. When the Zener diode 57 conducts the Zener current, i.e. when the cathode potential of the Zener diode 57 goes below 0V, a voltage higher than an activation voltage for the stopping transistor 58 is applied across the emitter-base circuit of the stopping transistor 58, so the stopping transistor 58 is turned on. When the stopping transistor 58 is turned on, the base and the emitter of the oscillation transistor 22 are connected to each other to have the same potential level, so that the oscillation transistor 22 is turned off, and thus a latching transistor 24 is turned off.

Because the turn ratio of the coil portion between the tap point 23f and the fourth terminal 23d to the primary coil 31 is remarkably smaller than the turn ratio of the entire secondary coil 32 to the primary coil 31, it is possible to tap out a comparatively large current from the tap point 23f. Therefore, even when the voltage from the battery 21 is lowered, for example due to a low ambient temperature, a sufficiently large base current enough for activating the stopping transistor 58 may be supplied to the base of the stopping transistor 58. Thus, the reliability of automatic stopping of the oscillation transistor 22 is improved.

As well-known in the art, the conductivity of semiconductor elements varies depending upon their temperatures. Concerning Zener diodes, the Zener voltage increases or decreases with a temperature increase depending upon a set value that is determined under a reference temperature. Specifically, those Zener diodes whose set Zener voltage is less than 5 to 6 volts have a negative temperature coefficient each, so the actual Zener voltage decreases with the temperature increase. On the contrary, those Zener diodes whose set Zener voltage is more than 5 to 6 volts have a positive temperature coefficient each, so the actual Zener voltage increases with the temperature increase.

The Zener voltage $V_Z$ also varies according to the variation in circumferential temperature as well as the temperature change due to heat in the Zener diode 57. As the Zener voltage $V_Z$ is set to be 10V in this instance, the Zener diode 57 has a positive temperature coefficient, so the actual Zener voltage $V_Z$ goes up as the temperature goes up. Without any temperature compensation, the Zener diode 57 would start conducting the Zener current when the voltage V4–Vf goes up above the given voltage Von1, i.e. until the main capacitor 41 has been charged up to a value more than the set value.

However, those diodes which are used for rectifying have negative temperature coefficients. Therefore, as the temperature increases, the voltage drop through the rectifying diode 56 decreases, and thus the voltage applied to the Zener diode 57 increases. Therefore, the negative temperature coefficient of the rectifying diode 56 is designed to compensate for the positive temperature coefficient of the Zener diode 57. That is, the total temperature coefficient of the diodes 56 and 57 is approximately zero. In this way, the Zener current begins to flow at the set charge voltage of the main capacitor 41, regardless of the temperature variations.

Now, the operation of the second embodiment will be described briefly.

When a flash charge switch 26 is turned on, the oscillation transistor 22 is turned on, and thus the latching transistor 24 is turned on. Because of the positive feedback from the oscillation transformer 23 and the base voltage from the latching transistor 24, the oscillation transistor 22 continues to oscillate even after the flash charge switch 26 is turned off.

Among of the secondary current which is generated by the electromotive force of the high voltage induced in the secondary coil 32 during the oscillation, those flowing in the direction from the fifth terminal 23e to the fourth terminal 23d are supplied through a charge current rectifying diode 25 to a charging-discharging section 40, and are used for charging the main capacitor 41 and a triggering capacitor 44. Simultaneously, a recharging capacitor 27 is charged with the secondary current of this direction.

Figure 5A:
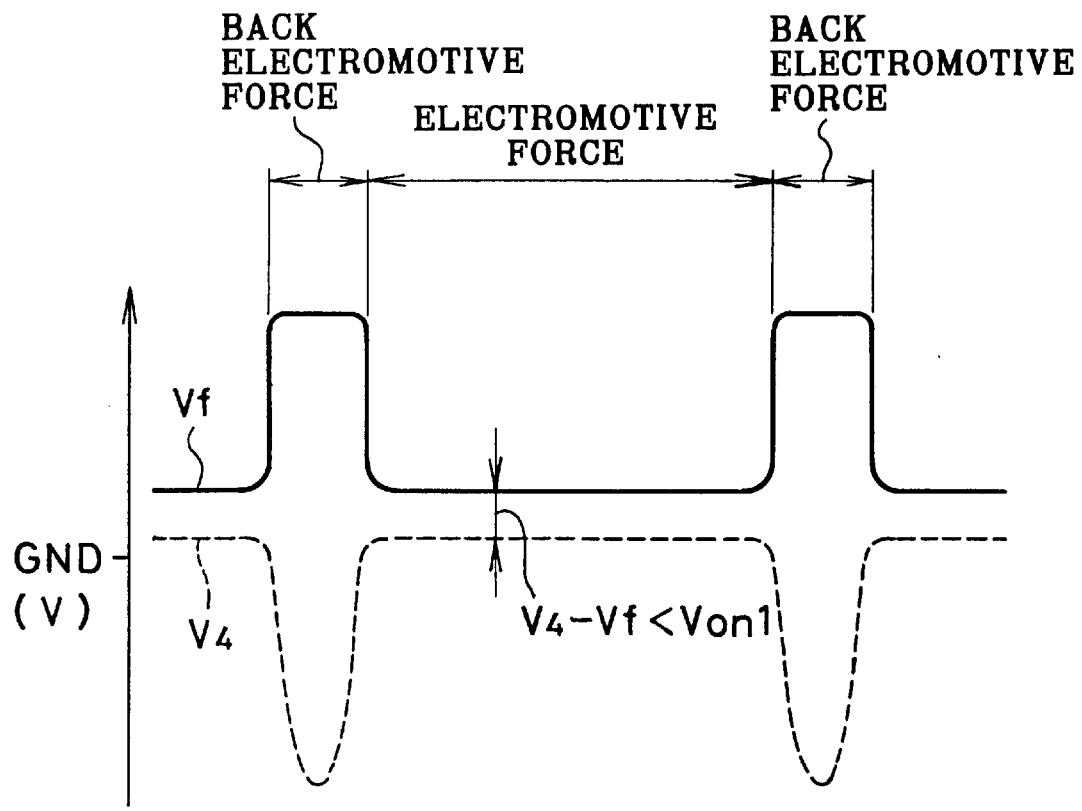
FIGS. 5A and 5B are timing charts illustrating the operation of the flash circuit of the second embodiment.

On the assumption that the ground potential GND at the minus pole of the battery 21 is a reference level (=0V), the potential level V4 at the fourth terminal 23d is maintained at a constant level that is higher than the ground potential GND by the base-emitter voltage of the oscillation transistor 22 while the electromotive force is generated on the oscillation transformer 23 in the first stage of charging when the charge voltage is around 0V, as shown in FIG. 5A. While the back electromotive force is generated, the potential level V4 at the fourth terminal 23f drops down like a pulse.

The potential level Vf at the tap point 23f is maintained constant while the electromotive force is generated, and jumps up like a pulse while the back electromotive force is generated. In either phase, the potential level Vf is higher than the potential level V4. Therefore, in the first stage of charging, the potential difference V4–Vf is applied across the rectifying diode 56 in the opposite direction, so that no current flows to the Zener diode 57 and thus to the base of the stopping transistor 58, so the stopping transistor 58 is not turned on.

As the main capacitor 41 is charged, the voltage across the main capacitor 41 increases. In this embodiment, the main capacitor 41 is designed to be charged in the negative direction, the positive terminal of the main capacitor 41 is maintained 0V, and the potential level at the negative terminal of the main capacitor 41 goes down. As a result, the load on the secondary coil 32 increases, so that the secondary current decreases, and the voltage of the electromotive force and that of the back electromotive force on the secondary coil 32 go down. In addition, the oscillation frequency of the blocking oscillator goes up.

Figure 5B:
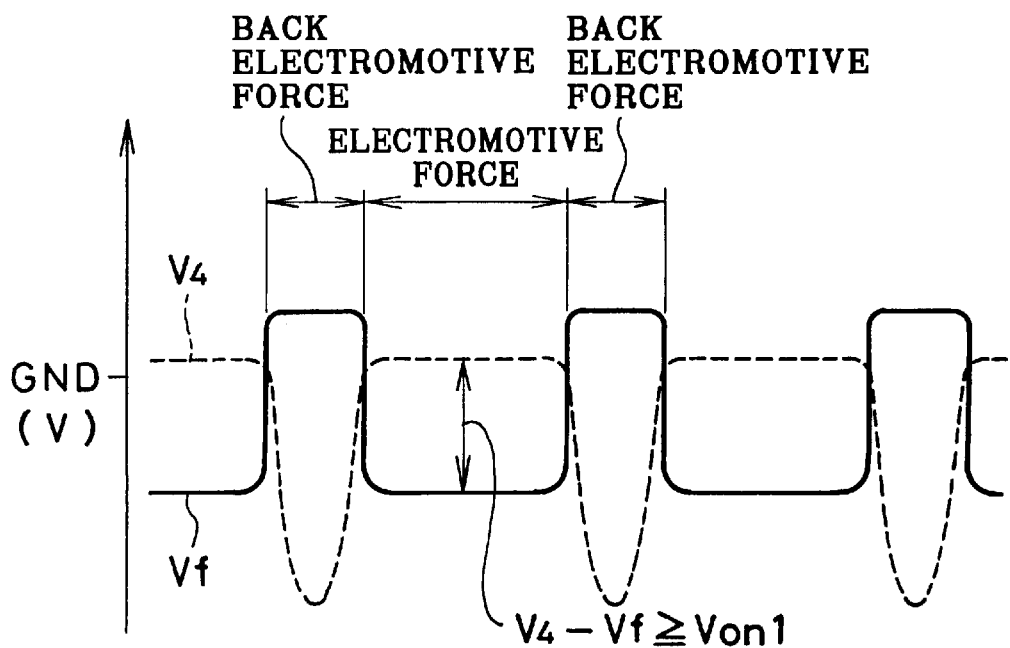

As the cycle of change in the potential level Vf is getting shorter, the potential level Vf goes down as the whole. On the other hand, the potential level V4 at the fourth terminal 23d changes between the same levels as in the first stage of charging, even through the cycle of change is getting shorter in the same way as the potential level Vf. Consequently, the potential level Vf goes below the potential level V4 while the electromotive force is generated, as shown in FIG. 5B, so that the voltage starts to be applied across the Zener diode 57. However, until the charge voltage of the main capacitor reaches the set value, the potential difference V4–Vf is less than the given voltage Von1, so the voltage applied to the Zener diode 57 is less than the Zener voltage $V_Z$. Therefore, the Zener diode 57 does not conduct the Zener current, and the stopping transistor 58 is not turned on until the main capacitor 41 is charged up to the set charge voltage. In this way, the oscillation transistor 22 continues to oscillate until the main capacitor 41 is charge up to the set charge voltage.

When the main capacitor 41 is charged up to the set voltage, i.e. 300V in this embodiment, the potential difference or voltage V4–Vf comes to the given voltage Von1, i.e. 10.6V, while the electromotive force is generated. Then, the Zener voltage $V_Z$ is applied across the Zener diode 57 through the rectifying diode 56, so that the Zener current flows through the Zener diode 57. Because of the Zener current, a current flows from the fourth terminal 23d to the base of the stopping transistor 58, turning on the stopping transistor 58. Indeed the voltage V4–Vf varies according to the oscillation of the blocking oscillator, it is rectified and smoothed through the rectifying diode 56 and the smoothing capacitor 59 before being applied to the Zener diode 57, it is possible to stably turn on the stopping transistor 58.

When the stopping transistor 58 is turned on, the base of the oscillation transistor 22 is connected to the emitter thereof through the stopping transistor 58, so that the oscillation transistor 22 is turned off. When the oscillation transistor 22 is turned off, the latching transistor 24 is turned off. Then, the oscillation transistor 22 does not continue to oscillate, thereby stopping charging the main capacitor 41.

In this way, when the main capacitor is charged up to the set voltage, the potential Vf at the tap point 23f of the secondary coil 32 comes down to a predetermined level, and the stopping transistor 58 is turned on to stop charging the main capacitor. As the oscillation stopping circuit 55 is constituted of the inexpensive rectifying diode 56 and Zener diode 57 with the low Zener voltage, the flash circuit of the second embodiment is also produced at a low cost.

Figure 6:
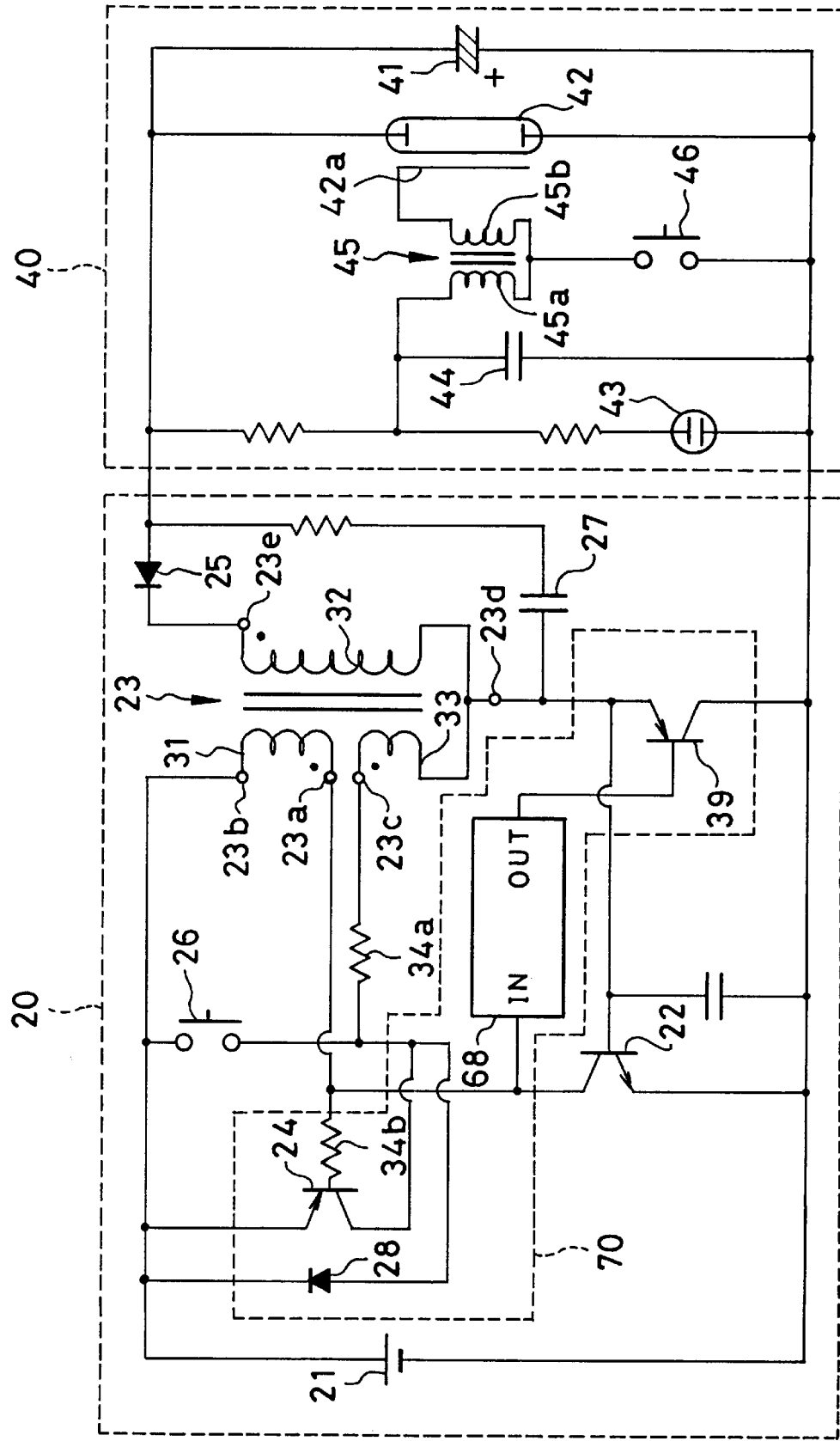
FIG. 6 is a circuit diagram of a flash circuit according to a third embodiment of the invention.

FIG. 6 shows a flash circuit according to a third embodiment of the invention. Aside from an oscillation frequency monitoring circuit 68, the third embodiment fundamentally has the same construction as the first embodiment. An oscillation transistor 22 and an oscillation transformer 23 constitute a well-known blocking oscillator that is directed to transforming a low voltage of a battery 21 to a high voltage for charging a main capacitor 41. The oscillation frequency monitoring circuit 68 has an input terminal IN connected to a first terminal 23a of a primary coil 31 of the oscillation transformer 23, and an output terminal OUT connected to the base of a stopping transistor 39. The emitter of the stopping transistor 39 is connected to a fourth terminal 23d of the oscillation transformer 23, and the collector of the stopping transistor 39 is grounded.

The oscillation frequency monitoring circuit 68 is constituted of a frequency-to-voltage (F/V) conversion circuit and a comparator. The F/V conversion circuit detects the oscillation frequency F of the blocking oscillator based on changes in potential level at the first terminal 23a, and outputs a voltage signal whose value increases as the oscillation frequency increases. The comparator compares the voltage signal representative of the oscillation frequency with a reference voltage, and outputs a drive control signal whose voltage level is high when the voltage signal is less than the reference voltage, or low when the voltage signal is equal to or more than the reference voltage. The drive control signal is applied to the base of the stopping transistor 39. The oscillation frequency monitoring circuit 68 includes a switch which is turned on or off in cooperation with the oscillation transistor 22 being turned on or off respectively.

Figure 7:
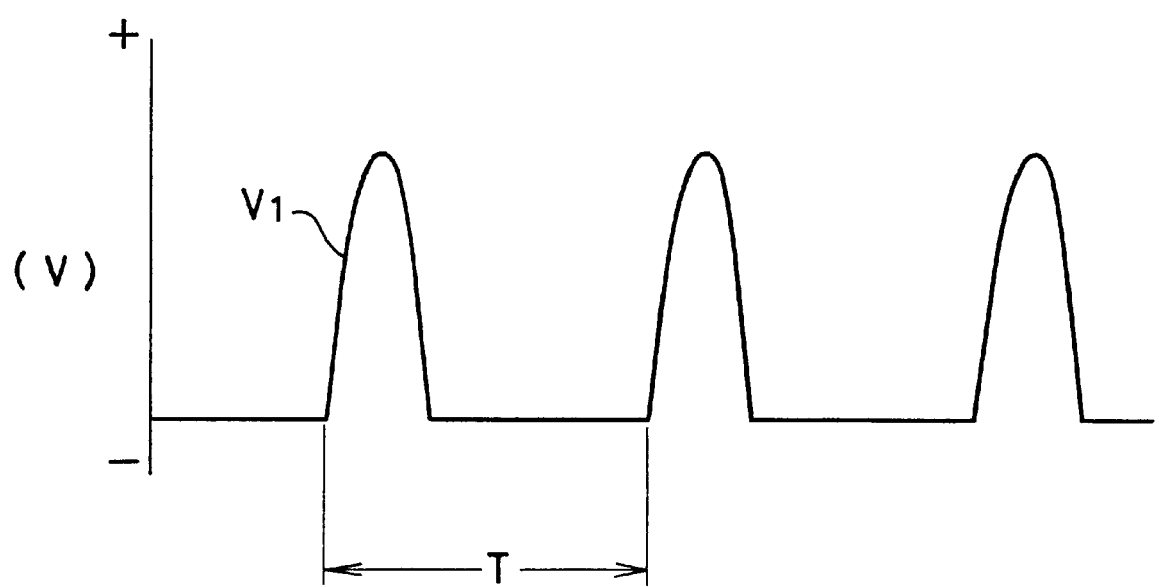
FIG. 7 is a timing chart illustrating voltage at a first terminal of an oscillation transformer of the flash circuit of the third embodiment.

Specifically, while the main capacitor 41 is being charged, the oscillation transformer 23 alternately generates electromotive force and back electromotive force due to the oscillation. As a result, the potential level V1 at the first terminal 23a cyclically changes. As shown in FIG. 7, the potential level V1 is maintained to be constant while the electromotive force is generated, but jumps up like a pulse while the back electromotive force is generated. The time period T of one cycle of this potential change is equal to that of the oscillation of the blocking oscillator: 1/F.

Figure 8A:
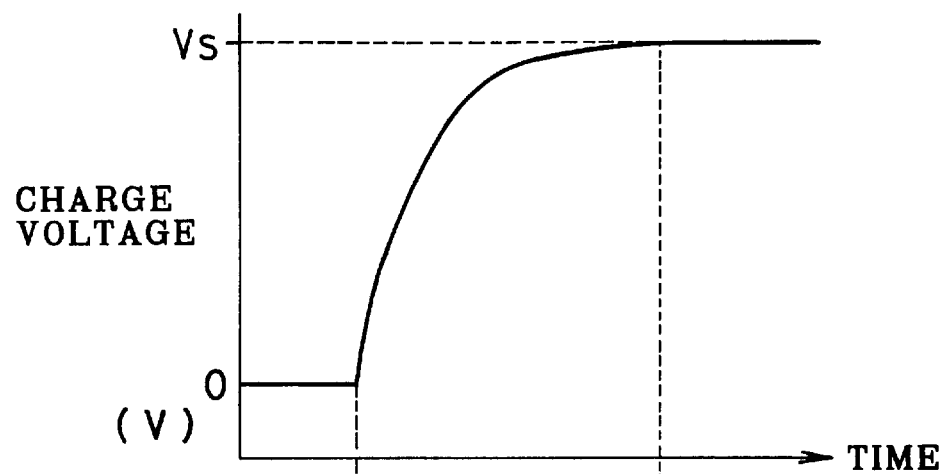
FIGS. 8A, 8B and 8C are timing charts illustrating relationship between charge voltage, oscillation frequency and drive control signal in the flash circuit of the third embodiment.
Figure 8B:
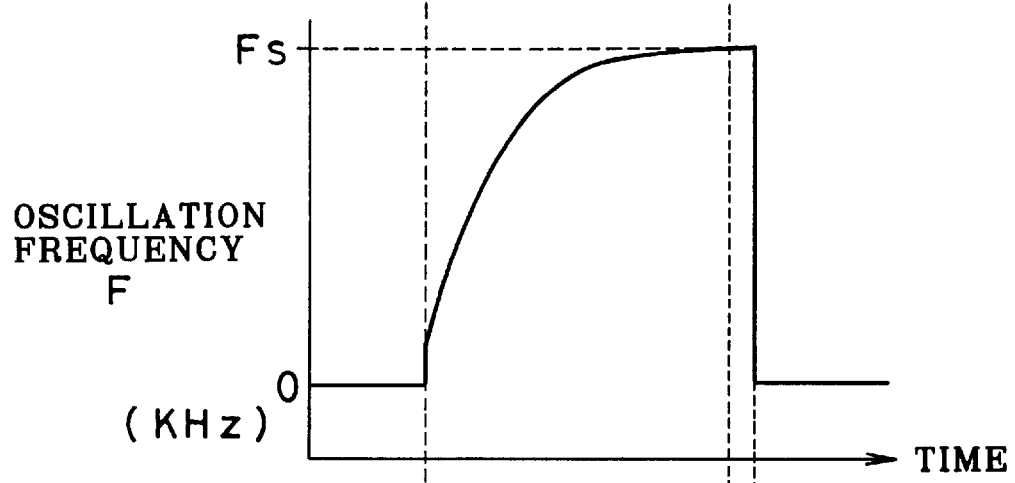

As shown in FIGS. 8A and 8B, as the charge voltage across the main capacitor 41 increases, the load on the secondary coil 32 increases, so that the oscillation frequency F increases, that is, the cycle T of the oscillation is getting shorter. When the charge voltage reaches a set value $V_S$, the oscillation frequency F reaches a maximum value $F_S$.

Figure 8C:
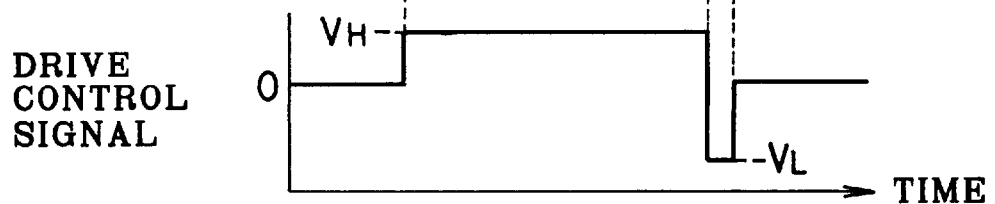

The reference voltage of the comparator is set to be equal to a voltage signal value that represents the maximum oscillation frequency value $F_S$ obtained at the set charge voltage $V_S$. Therefore, until the main capacitor 41 is charged up to the set charge voltage $V_S$, the oscillation frequency F is less than the maximum value $F_S$, so that the oscillation frequency monitoring circuit 68 outputs a high level drive control signal $V_H$ to the base of the stopping transistor 39, as shown in FIG. 8C. It is to be noted that the oscillation frequency F is about 1 KHz, i.e. T≈1000 μsec, in the first stage of charging, that is, while the charge voltage is around 0V.

When the main capacitor 41 has been charged up to the set value $V_S$, the blocking oscillator starts oscillating at the maximum frequency $F_S$, e.g. about 10 KHz (T≈100 μsec). Then, the oscillation frequency monitoring circuit 68 outputs a low level drive control signal $V_L$ to the base of the stopping transistor 39, as shown in FIG. 8C.

On the assumption that Vd represent a voltage value or potential level applied at the fourth terminal 23d while the electromotive force is being generated in the oscillation transformer 23, and Von2 represents an activation voltage necessary to apply across the base-emitter circuit of the stopping transistor 39 for turning on the stopping transistor 39, the values $V_H$ and $V_L$ are determined such that $V_H \geq Vd$ and $Vd-V_L \geq Von2$. In this embodiment, Vd=0.7, and Von2=0.7V, and hence $V_H \geq 0.7V$, and $V_L = 0 \sim -1V$.

Accordingly, while the high level drive control signal $V_H$ is applied to the base, the stopping transistor 39 stays in the OFF state. When the low level drive control signal $V_L$ is applied to the base of the stopping transistor 39 while the electromotive force is generated in the oscillation transformer 23, that is, while the voltage at the fourth terminal 23d has the value Vd, a voltage more than the activation voltage Von2 is applied across the emitter-base circuit of the stopping transistor 39, so that the stopping transistor 39 is turned on. While the back electromotive force is generated in the oscillation transformer 23, the voltage at the fourth terminal 23d goes down from the value Vd. That is, while the back electromotive force is generated in the oscillation transformer 23, the voltage at the fourth terminal 23d is also less than the voltage $V_H$, so that the stopping transistor 39 would not be turned on.

When the stopping transistor 39 is turned on, the oscillation transistor 22 is turned off, and the latching transistor 24 is turned off. In this way, the oscillation frequency monitoring circuit 68 and the stopping transistor 39 constitute an oscillation stopping device.

In the above embodiment, the oscillation frequency monitoring circuit 68 detects the oscillation frequency from the potential or voltage change at the first terminal 23a of the oscillation transformer 23. As the voltage at the third terminal 23c or the fourth terminal 23d changes in accordance with the oscillation of the blocking oscillator, it is alternatively possible to detect the oscillation frequency from the voltage at the third terminal 23c or the fourth terminal 23d.

Although the oscillation frequency monitoring circuit 68 needs a relatively large number of elements, these elements are easy to integrate, so that it is possible to produce the oscillation frequency monitoring circuit 68 at a lower cost than the conventional Zener diode with a high Zener voltage. It is preferable in terms of production cost and compactness to integrate not only the oscillation frequency monitoring circuit 68 but also the latching transistor 24, the stopping transistor 39, a looping diode 28 and a resistor 34b into a single IC chip 70. It is of course possible to integrate only the oscillation frequency monitoring circuit 68 into an IC chip, or combine other integrable elements than above with the oscillation frequency monitoring circuit 68 into an IC chip.

Figure 9:
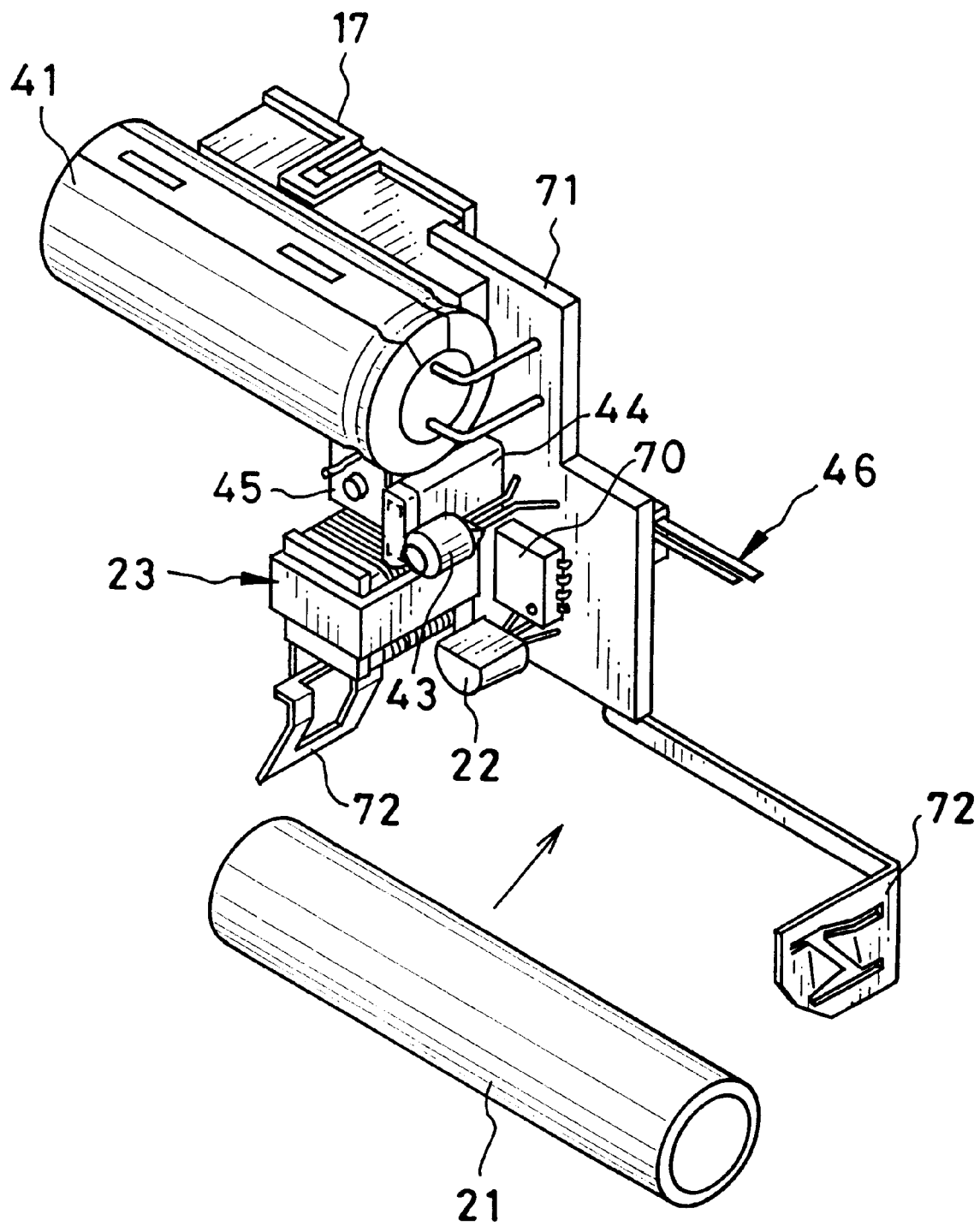
FIG. 9 is a perspective view of a flash device built in the film unit, having the flash circuit of the third embodiment.

FIG. 9 shows an example of a flash device wherein the elements of the flash circuit, including the IC chip 70, are mounted on a printed circuit board 71. The flash projector 17 containing the flash discharge tube 42 is secured to a front side of the printed circuit board 71, while the oscillation transistor 22, the oscillation transformer 23, the main capacitor 41, the neon lamp 43, the triggering capacitor 44, the triggering transformer 45, the triggering switch 46, the IC chip 70 and a pair of contact electrodes 72 for holding the battery 21 are mounted to a rear side or a right side of the printed circuit board 71. These elements are connected to one another by soldering.

The IC chip 35 saves the mounting space compared with the case where the individually packaged elements are to be mounted to the printed circuit board 71, so that the printed circuit board 71 may be smaller than conventional, contributing to compactness of the film unit. The IC chip 35 also reduces the number of necessary mounting steps compared with the case where the individual elements are to be mounted step by step, so that the production cost is cut down. It is possible to mount the IC chip 35 on the front side of the circuit board 71 and connect it directly to printed circuit patterns by soldering.

Figure 10:
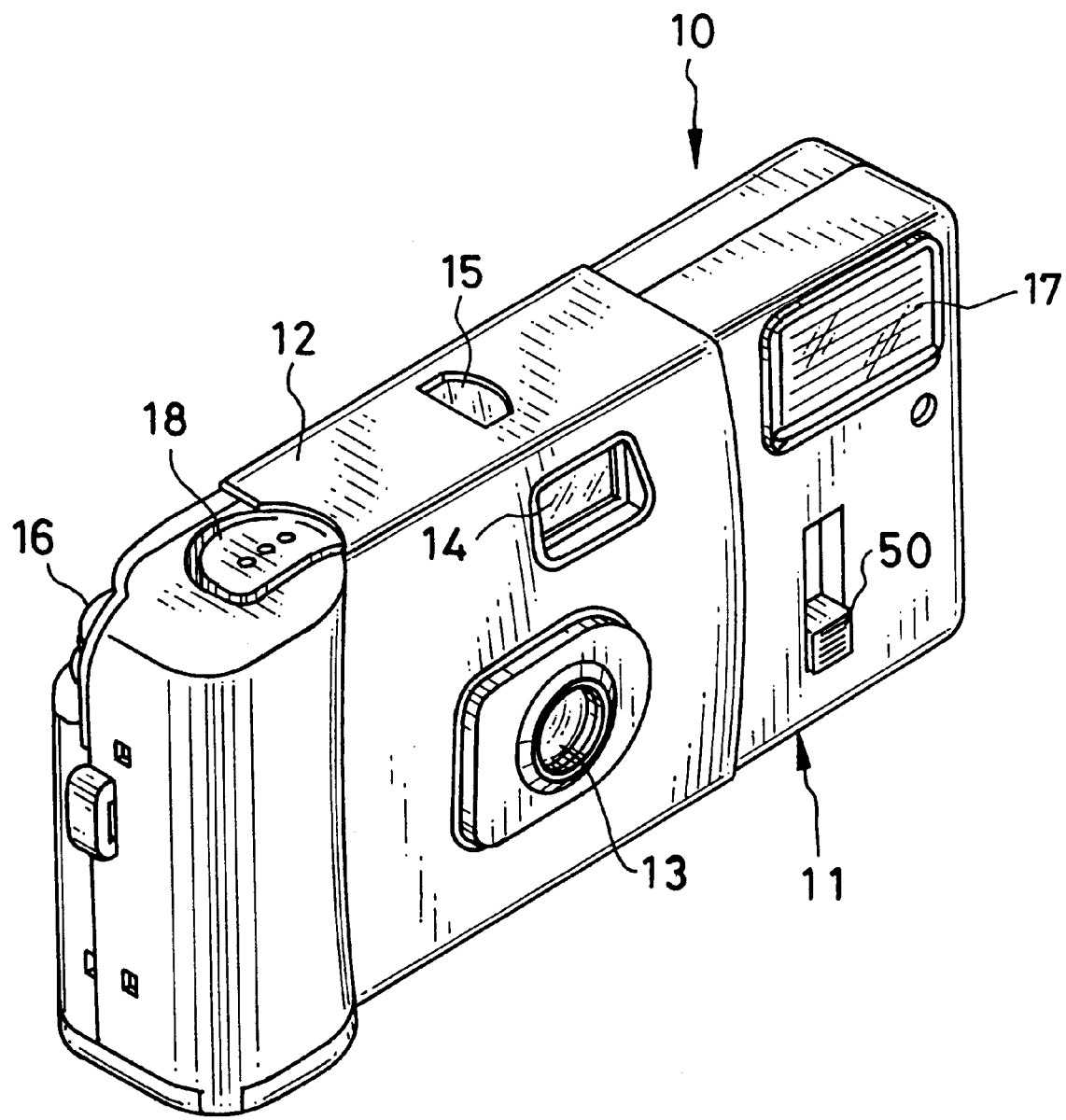
FIG. 10 is a perspective view of a lens-fitted film unit provided with a flash circuit according to a fourth embodiment of the invention.

FIG. 10 shows another embodiment of the present invention, wherein a film unit 10 is provided with an operation member 50 that is slidable between an ON position and an OFF position. Setting the operation member 50 in the ON position causes a flash device to start charging a main capacitor 41 up to a set voltage, e.g. 300V. So long as the operation member 50 is maintained in the ON position, the main capacitor 41 is intermittently charged up to the set voltage for supplement natural discharge. The operation member 50 is also used for selecting whether a flash light is to be projected or not. That is, when the operation member 50 is in the ON position, the flash light is projected during the exposure. But when the operation member 50 is in the OFF position, the flash light is not projected even if the main capacitor 41 is charged up.

Figure 11:
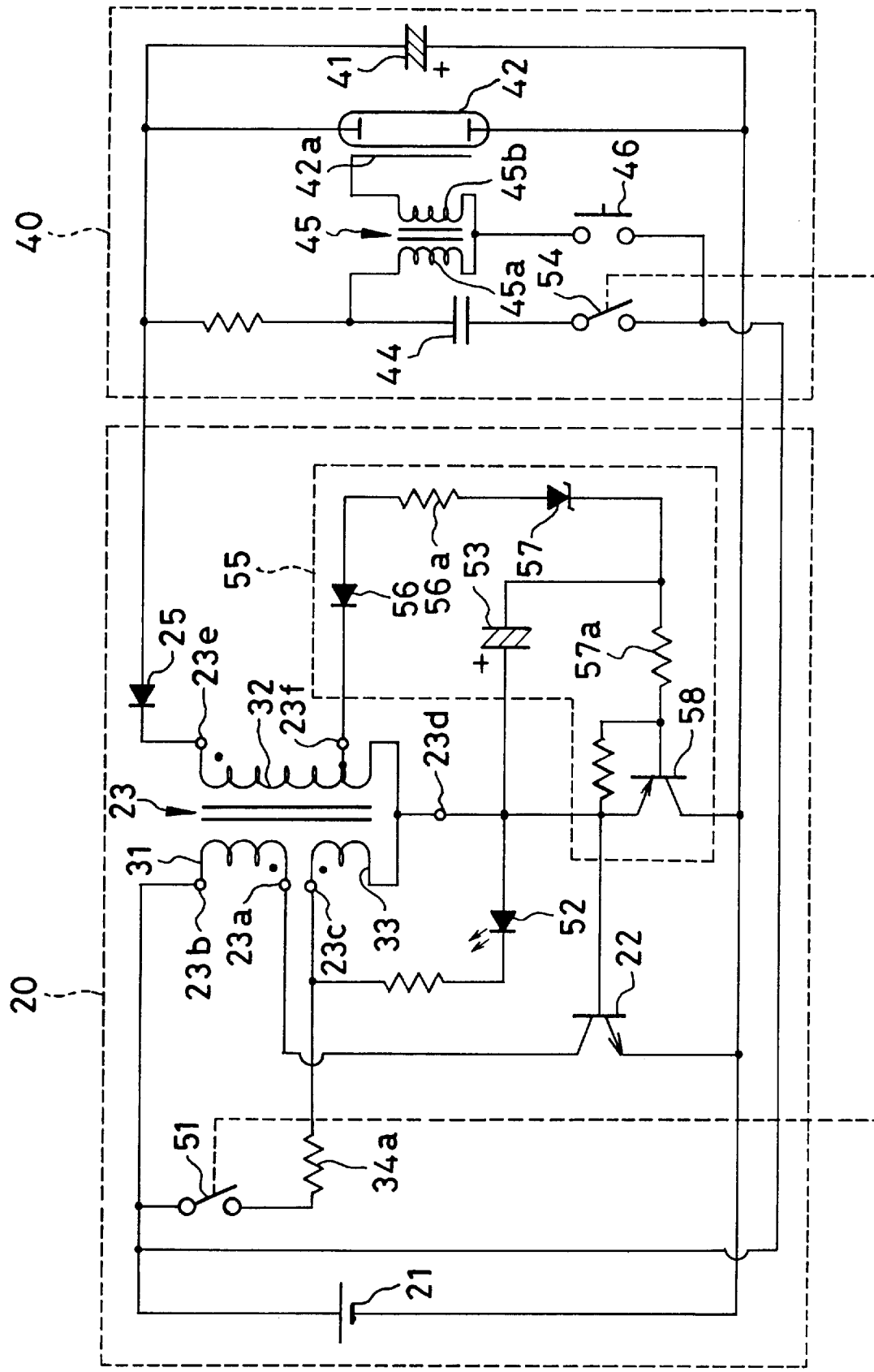
FIG. 11 is a circuit diagram of the flash circuit of the fourth embodiment.

FIG. 11 shows the flash circuit provided in the film unit of FIG. 10. A booster section 20 is provided with a flash charge switch 51 that is turned on while the operation member 50 is in the ON position, or off while the operation member 50 is in the OFF position. Unlike the above embodiments, the booster section 20 does not have a latching transistor 24, a looping diode 28, a recharging capacitor 27 and a smoothing capacitor 59. When the flash charge switch 51 is turned on, a current flows into the base of an oscillation transistor 22, so that the oscillation transistor 22 oscillates, and the main capacitor 41 is charged with a high voltage generated through an oscillation transformer 23. That is, a blocking oscillator consisting of the oscillation transistor 22 and the oscillation transformer 23 operates while the flash charge switch 51 is in the ON state.

Instead of a neon lamp, a light emission diode (LED) 52 is connected between a third terminal 23c and a fourth terminal 23d of the oscillation transformer 23, for indicating completion of charging of the main capacitor 41. Anode of the LED 52 is connected to the fourth terminal 23d such that the LED 52 starts lighting when the main capacitor 41 is charged up to the set voltage. Detail of the LED 52 is disclosed in JPA 8-115796.

The flash circuit of FIG. 11 includes an oscillation stopping circuit 55 that is similar to the oscillation stopping circuit of FIG. 4, as having a rectifying diode 56 connected in series to a tap point 23f of a secondary coil 32, resistors 56a and 57a, a Zener diode 57 and a stopping transistor 58, but includes a stopping capacitor 53. Also in this embodiment, the rectifying diode 56 and the Zener diode 57 constitute a mutual temperature compensating circuit.

Since the flash charge switch 51 is maintained in the ON state to charge the main capacitor 41, the oscillation transistor 22 is not always deactivated by the stopping transistor 58 being turned on for a moment. To make sure that the oscillation transistor 22 stops oscillating when the main capacitor 41 is charged up to the set voltage, the stopping capacitor 53 is connected between cathode of the Zener diode 57 and the fourth terminal 23d of the oscillation transformer 23. When the main capacitor 41 is charged up to the set voltage, a Zener current flows through the Zener diode 57, in the same way as described with respect to the second embodiment of FIG. 4.

But the Zener current flows through the stopping capacitor 53 in the direction from the fourth terminal 23d to the tap point 23f, so that the stopping capacitor 53 is charged with the Zener current directly, that is, without any intermediate resistor. Therefore, the stopping capacitor 53 is charged up to an appropriate full voltage in a moment, e.g. about 10ms (micro seconds).

Figure 12:
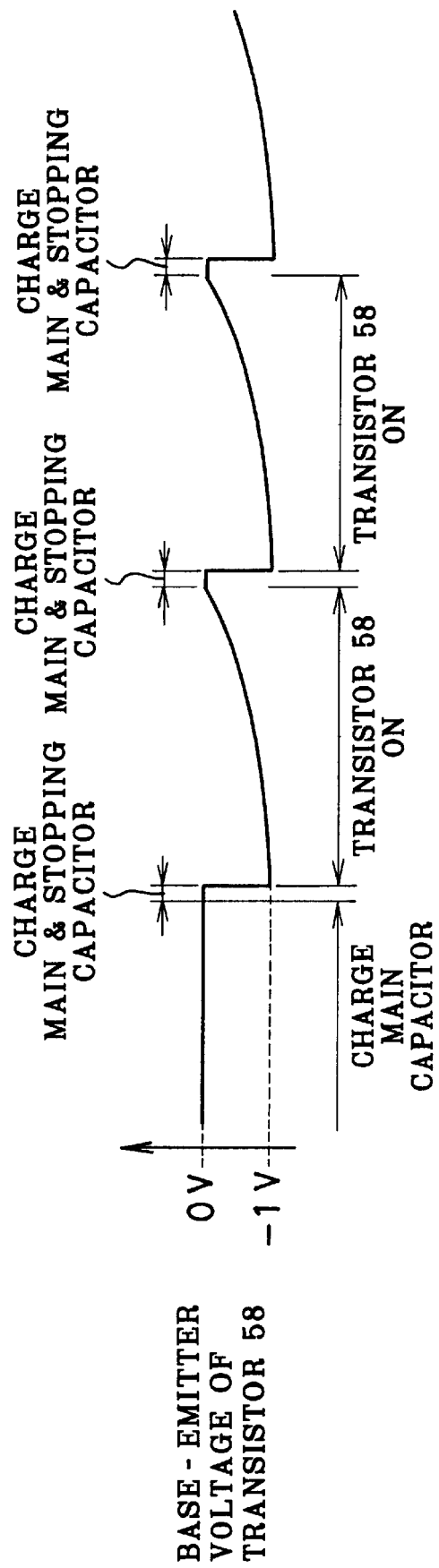
FIG. 12 is a timing chart illustrating relationship between base-emitter voltage of a stopping transistor and charging cycles for a main capacitor and a stopping capacitor.
Figure 13:
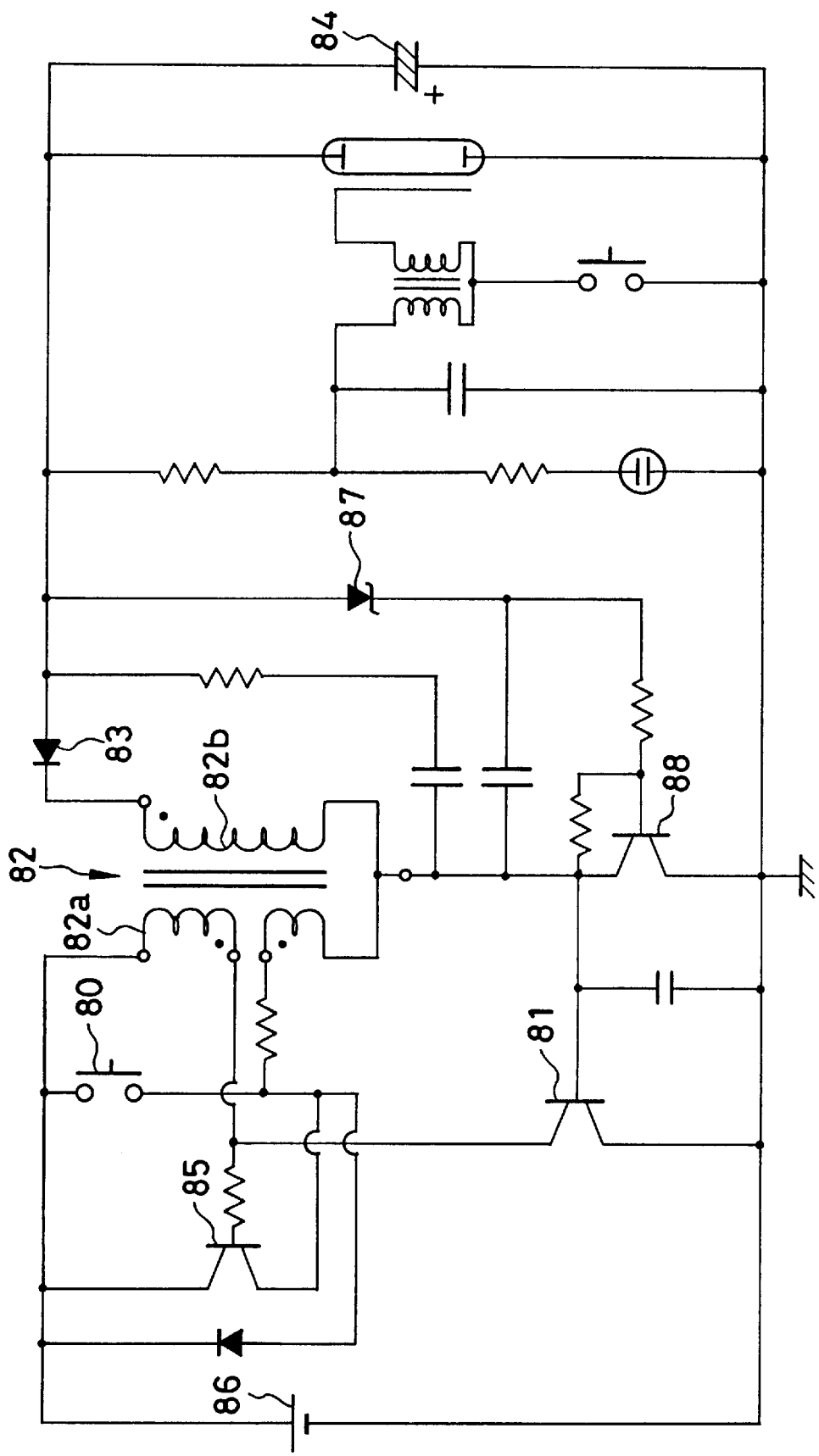
FIG. 13 is a circuit diagram of a conventional flash circuit.

As shown in FIG. 12, as the Zener current flows through the stopping capacitor 53 immediately after the charge voltage of the main capacitor 41 reaches the set value, the base-emitter voltage of the stopping transistor 58 goes to zero, so that the stopping transistor 58 is not turned on. When the stopping capacitor 53 is charged up, the charge voltage of the stopping capacitor 53 is applied across the base-emitter circuit of the stopping transistor 58, so that the circuit from the stopping capacitor 53 through the base and the emitter of the stopping transistor 58 to the resistor 57a is closed, and thus the stopping capacitor 53 discharges. The discharged current flows in the base of the stopping transistor 58, thereby turning on the stopping transistor 58. As a result, a current that has been applied from a battery 21 to the base of the oscillation transistor 22 through the flash charge switch 51 begins to flow through the emitter-collector circuit of the stopping transistor 58, so that the oscillation transistor 22 is deactivated, and charging of the main capacitor 41 is terminated.

Discharging through the resistor 57a is for supplying the base current of the stopping transistor 58 for a longer time. As long as the base current is supplied, the stopping transistor 58 is turned on. Consequently, the stopping transistor 58 is turned on for the longer time enough to stop the oscillation transistor 22 from oscillating. The ON-period of the stopping transistor 58 may be set by adjusting time coefficient that is determined by the capacitance of the stopping capacitor 53 and the resistance of the resistor 57a. In this embodiment, the capacitance of the stopping capacitor 53 is 47μF, and the resistance of the resistor 57a is 10 KΩ, whereby the ON-period of the stopping transistor 58 is set to be 0.3 seconds in actual measurement. According to this configuration, the oscillation transistor 22 stops oscillating at least for 0.3 seconds, even while the flash charge switch 51 is in the ON state.

As the stopping capacitor 53 discharges, the charge voltage of the stopping capacitor 53 goes down. When the charge voltage of the stopping capacitor 53 goes below a predetermined value, the stopping transistor 58 is turned off.

So long as the flash charge switch 51 is in the ON state, the current from the battery 21 restarts flowing into the base of the oscillation transistor 22, so that the oscillation transistor 22 restarts oscillating. Since the main capacitor 41 has already been charged up to the set voltage, the Zener current flows through the Zener diode 57 as soon as the oscillation restarts. As the stopping capacitor 53 is fully charged with the Zener current soon and then starts discharging, the stopping transistor 58 is turned on by the discharged current in short time after the restart of oscillation. Thus, charging the main capacitor 41 is terminated soon.

In the same way as above, the stopping transistor 58 is turned on and off repeatedly, so that the oscillation transistor 22 stops and restarts oscillating repeatedly. Therefore, so long as the flash charge switch 51 is in the ON state, the main capacitor 41 is charged repeatedly and intermittently to supplement the natural discharge of the main capacitor 41, and thereby to maintain the charge voltage of the main capacitor 41 approximately constant.

In a charging-discharging section 40, a terminal of a triggering capacitor 44 and a common terminal of primary and secondary coils 45a and 45b are connected to a pulse pole of the battery 21, and a flash selection switch 54 is connected in series to the triggering capacitor 44. The flash selection switch 54 is turned on in cooperation with the flash charge switch 51 being turned on by setting the operation member 50 to the ON position, or off when the operation member 50 and thus the flash charge switch 51 is off.

According to this configuration, the triggering capacitor 44 is charged with the current from the booster section 20 when the flash section switch 54 is in the ON state. Even when the main capacitor 41 is fully charged, if the flash selection switch 54 is in the OFF state, the triggering capacitor 44 could not discharge, so that no triggering voltage is applied to a flash discharge tube 42 even when a triggering switch 46 is turned on.

As the main capacitor 41 is being charged, the potential at the third terminal 23c goes down gradually. Finally, the potential at the third terminal 23c becomes less than the potential at the fourth terminal 23d in the phases when back electromotive forces are not generated. Then, the voltage is applied across the LED 52 in its forward direction. In this embodiment, when the charge voltage in the main capacitor 41 goes above 250V, the potential difference between the third and fourth terminals 23c and 23d becomes so large that the LED 52 emits light at a visible intensity. When the main capacitor 41 is charged up to the set voltage of 300V, the potential difference between the third and fourth terminals 23c and 23d becomes large enough for the LED 52 to emit light at a predetermined high intensity.

The LED 52 stops lighting while the stopping transistor 58 is turned on. Therefore, the intermission of lighting of the LED 52 is determined concurrently when the ON-period of the stopping transistor 58 is set by adjusting the time coefficient that is determined by the capacitance of the stopping capacitor 53 and the resistance of the resistor 57a. If the LED 52 is provided in a flash circuit where the stopping transistor 58 were turned on directly by the Zener current, the intervals of intermission of lighting of the LED 52 could vary largely due to variations in the circumferential temperature, in the leak current from the main capacitor 41, in the performance of the individual Zener diode, and so on. According to the configuration of FIG. 11, the LED 52 can emit light at regular intervals.

It is possible to connect the stopping capacitor 53 between the cathode of the Zener diode 57 and the fourth terminal 23d of the oscillation transformer 23 in the flash circuit of FIG. 4. Thereby, the stopping transistor 58 will not be affected by electric noises that might be caused when the main capacitor 41 is almost charged up to the set voltage, and will be turned on for a sufficiently long time enough to stop charging the main capacitor 41. The stopping capacitor as above is preferably applicable to a flash circuit which needs to keep pushing a flash charge button for continuing charging.

Although the above described embodiments charge the main capacitor in the negative direction, the present invention is applicable to those flash circuits whose main capacitor is charged in the positive direction. In that case, the potential of a tap point at an intermediate position of a secondary coil of an oscillation transformer increases as the charge voltage in the main capacitor increases. Accordingly, a rectifying diode and a Zener diode should be connected in the opposite polarity to the above embodiments between the tap point and the base of a stopping transistor.

The present invention is of course applicable to a built-in flash device of a camera, or to a flash device attachment.

Thus, the present invention is not to be limited to the above embodiments but, on the contrary, various modifications will be possible for those skilled in the arts without departing from the scope of claims attached hereto.

What is claimed is:

1. A flash circuit comprising:

an oscillation transformer having a primary coil connected to a power source and a secondary coil connected to a main capacitor, for boosting a low power source voltage up to a high voltage for charging the main capacitor;

an oscillation transistor connected between the power source and the oscillation transformer and oscillating in cooperation with the oscillation transformer to conduct oscillating current through the oscillation transformer; and an oscillation stopping device which taps out voltage proportional to but less than charge voltage in the main capacitor from the oscillation transformer, and which is driven to deactivate the oscillation transistor when the charge voltage in the main capacitor reaches a set voltage;

wherein the primary coil is connected at one terminal to a plus pole of the power source, and at the other terminal to a minus pole of the power source through collector-emitter circuit of the oscillation transistor, and the secondary coil is connected at one terminal to base of the oscillation transistor, wherein the oscillation transformer further has a tertiary coil, the tertiary coil being connected at one terminal to the plus pole of the power source through a flash charge switch, and at the other terminal to the base of the oscillation transistor, the oscillation transistor being activated upon a charge start signal entered through the flash charge switch, and wherein the oscillation stopping device comprises a stopping transistor whose base is connected to the one terminal of the tertiary coil through a voltage divider, whose emitter is connected to the base of the oscillation transistor, and whose collector is connected to the minus pole of the power source, such that when the charge voltage reaches the set voltage the stopping transistor is turned on to connect the base of the oscillation transistor to the emitter thereof, thereby deactivating the oscillation transistor.

2. A flash circuit as claimed in claim 1, wherein the oscillation stopping device further comprises a rectifying diode connected between the base of the stopping transistor and the voltage divider, the rectifying diode conducting current only in a direction from the base of the stopping transistor to the voltage divider.

3. A flash circuit as claimed in claim 2, further comprising a latching transistor whose base is connected to the collector of the oscillation transistor, whose emitter is connected to the plus pole of the power source, and whose collector is connected to the one terminal of the tertiary coil, and a diode connected in parallel to the emitter-collector circuit of the latching transistor, the latching transistor applying a bias voltage to the base of the oscillation transistor, thereby to keep the oscillation transistor oscillating after the flash charge switch is turned off.

4. A flash circuit comprising:

an oscillation transformer having a primary coil connected to a power source and a secondary coil connected to a main capacitor, for boosting a low power source voltage up to a high voltage for charging the main capacitor;

an oscillation transistor connected between the power source and the oscillation transformer and oscillating in cooperation with the oscillation transformer to conduct oscillating current through the oscillation transformer; and an oscillation stopping device which taps out voltage proportional to but less than charge voltage in the main capacitor from the oscillation transformer, and which is driven to deactivate the oscillation transistor when the charge voltage in the main capacitor reaches a set voltage;

wherein the oscillation stopping device comprises a stopping transistor and a Zener diode connected between a tap point located at an intermediate position of the secondary coil and a base of the stopping transistor, the stopping transistor being turned on in response to a Zener current conducted through the Zener diode when the main capacitor is charged up to the set voltage, the stopping transistor being connected to the oscillation transistor such that the oscillation transistor is deactivated when the stopping transistor is turned on;

wherein the primary coil is connected at one terminal to a plus pole of the power source and at the other terminal to a minus pole of the power source through collector-emitter circuit of the oscillation transistor, and the secondary coil is connected at one terminal to a base of the oscillation transistor, and wherein emitter and collector of the stopping transistor are connected to the base and the emitter of the oscillation transistor respectively, a potential difference between the tap point and the base of the oscillation transistor being the voltage proportional to the charge voltage, and causing the Zener diode to conduct the Zener current when the main capacitor is charged up to the set voltage, and the stopping transistor is turned on to connect the base of the oscillation transistor to the emitter thereof, thereby deactivating the oscillation transistor.

5. A flash circuit as claimed in claim 4, further comprising a rectifying diode connected between the tap point and the Zener diode, the rectifying diode conducting current only in the same direction as the Zener current.

6. A flash circuit as claimed in claim 5, wherein the rectifying diode has a temperature coefficient whose polarity and value are designed to compensate for a temperature coefficient of the Zener diode.

7. A flash circuit as claimed in claim 6, wherein the oscillation transformer further has a tertiary coil, the tertiary coil being connected at one terminal to the plus pole of the power source through a flash charge switch, and at the other terminal to the base of the oscillation transistor, the oscillation transistor being activated upon a charge start signal entered through the flash charge switch.

8. A flash circuit as claimed in claim 7, further comprising a latching transistor whose base is connected to the collector of the oscillation transistor, whose emitter is connected to the plus pole of the power source, and whose collector is connected to the one terminal of the tertiary coil, and a diode connected in parallel to the emitter-collector circuit of the latching transistor, the latching transistor applying a bias voltage to the base of the oscillation transistor, thereby to keep the oscillation transistor oscillating after the flash charge switch is turned off.

9. A flash circuit comprising:
   an oscillation transformer having a primary coil connected to a power source and a secondary coil connected to a main capacitor, for boosting a low power source voltage up to a high voltage for charging the main capacitor up to a set voltage;
   an oscillation transistor connected between the power source and the oscillating transformer and oscillating in cooperation with the oscillation transformer to conduct oscillating current through the oscillating transformer;
   a Zener diode connected to a tap point located at an intermediate position of the secondary coil for tapping out a voltage that is proportional to but less than the charge voltage in the main capacitor, the Zener diode conducting a Zener current when the voltage tapped out from the tap point reaches a predetermined value corresponding to the set charge voltage of the main capacitor;
   a stopping capacitor connected to the Zener diode so that the stopping capacitor is charge only with the Zener current; and
   a stopping transistor connected to the stopping capacitor through a resistor so that the stopping transistor is turned on while the stopping capacitor discharges through the resistor and the stopping transistor, thereby deactivating the oscillation transistor.

10. A flash circuit as claimed in claim 9, further comprising a flash charge switch which is alternatively maintained in an ON state or in an OFF state, wherein the oscillation transistor is activated when the flash charge switch is turned on, and so long as the flash charge switch is in the ON state, the stopping capacitor is periodically charged and discharged to intermittently charge the main capacitor up to the set voltage.

11. A flash circuit as claimed in claim 10, wherein the primary coil is connected at one terminal to a plus pole of the power source, and at the other terminal to a minus pole of the power source through collector-emitter circuit of the oscillation transistor, and the secondary coil is connected at one terminal to base of the oscillation transistor, wherein base of the stopping transistor is connected to the Zener diode through the resistor, and emitter and collector of the stopping transistor are connected to the base and the emitter of the oscillation transistor respectively, and wherein the stopping capacitor is connected at one electrode to the one terminal of the secondary coil that is connected to the base of the oscillation transistor, and at the other electrode to a connecting point between the Zener diode and the resistor.

12. A flash circuit as claimed in claim 11, wherein the oscillation transformer further has a tertiary coil, the tertiary coil being connected at one terminal to the plus pole of the power source through the flash charge switch, and at the other terminal to the base of the oscillation transistor.

13. A flash circuit as claimed in claim 9, further comprising a rectifying diode connected between the tap point and the Zener diode, the rectifying diode conducting current only in the same direction as the Zener current.

14. A flash circuit as claimed in claim 9, wherein the rectifying diode has a temperature coefficient whose polarity and value are designed to compensate for a temperature coefficient of the Zener diode.

15. A flash circuit comprising:
    an oscillation transformer having a primary coil connected to a power source and a secondary coil connected to a main capacitor, for boosting a low power source voltage up to a high voltage for charging the main capacitor;
    an oscillation transistor connected between the power source and the oscillation transformer and oscillating in cooperation with the oscillation transformer to conduct oscillating current through the oscillation transformer; and
    an oscillation stopping device detecting oscillation frequency of the oscillating current as being proportional to charge voltage in the main capacitor, and deactivating the oscillation transistor when it is determined based on the oscillation frequency that the charge voltage in the main capacitor reaches a set voltage.

16. A flash circuit as claimed in claim 15, wherein the primary coil is connected at one terminal to a plus pole of the power source and at the other terminal to a minus pole of the power source through collector-emitter circuit of the oscillation transistor, and the secondary coil is connected at one terminal to base of the oscillation transistor, and wherein the oscillation stopping device comprises a stopping transistor whose emitter and collector are connected to the base of the oscillation transistor and the minus pole of the power source respectively, and a frequency monitoring device having an input connected to one of the primary, secondary and tertiary coils, and an output connected to base of the stopping transistor, the frequency monitoring device outputting a predetermined voltage to turn on the stopping transistor and deactivate the oscillation transistor when the oscillation frequency reaches a value that corresponds to the set charge voltage.

17. A flash circuit as claimed in claim 16, wherein the oscillation transformer further has a tertiary coil, the tertiary coil being connected at one terminal to the plus pole of the power source through a flash charge switch, and at the other terminal to the base of the oscillation transistor, such that the oscillation transistor is activated upon a charge start signal entered through the flash charge switch.

18. A flash circuit as claimed in claim 15, wherein at least the oscillation stopping device is integrated into an IC chip.

19. A flash circuit as claimed in claim 17, further comprising a latching transistor whose base is connected to the collector of the oscillation transistor, whose emitter is connected to the plus pole of the power source, and whose collector is connected to the one terminal of the tertiary coil, and a looping diode connected in parallel to the emitter-collector circuit of the latching transistor, the latching transistor applying a bias voltage to the base of the oscillation transistor, thereby to keep the oscillation transistor oscillating after the flash charge switch is turned off, wherein the latching transistor and the looping diode are integrated with the oscillation stopping device into an IC chip.

20. The flash circuit of claim 9, wherein a first terminal of the stopping capacitor is directly connected to the resistor, and a second terminal of the stopping capacitor is directly connected to the stopping transistor.

21. The flash circuit of claim 20, wherein values of the stopping capacitor and the resistor determine a length of time during which the stopping transistor is turned on while the stooping capacitor discharges.

\* \* \* \* \*